US012619823B2

(12) United States Patent
Sha et al.

(10) Patent No.: US 12,619,823 B2
(45) Date of Patent: May 5, 2026

(54) COMPUTER-IMPLEMENTED SYSTEM AND METHOD TO PERFORM NATURAL LANGUAGE PROCESSING ENTITY RESEARCH AND RESOLUTION

(71) Applicant: Wei Sha, Stirling, NJ (US)

(72) Inventors: Wei Sha, Stirling, NJ (US); Yulia Kiryutina, Stirling, NJ (US)

( * ) Notice: Subject to any disclaimer, the term of this patent is extended or adjusted under 35 U.S.C. 154(b) by 323 days.

(21) Appl. No.: 18/195,297

(22) Filed: May 9, 2023

(65) Prior Publication Data

US 2023/0359826 A1      Nov. 9, 2023

Related U.S. Application Data

(60) Provisional application No. 63/339,930, filed on May 9, 2022.

(51) Int. Cl.
G06F 40/295         (2020.01)
G06N 3/08           (2023.01)

(52) U.S. Cl.
CPC ............. *G06F 40/295* (2020.01); *G06N 3/08* (2013.01)

(58) Field of Classification Search
CPC ................................ G06F 40/295; G06N 3/08
See application file for complete search history.

(56) References Cited

U.S. PATENT DOCUMENTS

| | | | | |
|---|---|---|---|---|
| 2010/0185691 A1* | 7/2010 | Irmak | .................... | G06F 16/353 |
| | | | | 707/E17.039 |
| 2012/0101808 A1* | 4/2012 | Duong-Van | ............. | G06F 40/30 |
| | | | | 704/9 |
| 2015/0331877 A1* | 11/2015 | Lou | ........................ | G06F 16/284 |
| | | | | 707/722 |
| 2021/0110475 A1* | 4/2021 | Singh | .................... | G06F 40/205 |
| 2023/0135625 A1* | 5/2023 | Wang | ...................... | G06F 40/35 |
| | | | | 704/9 |
| 2023/0315736 A1* | 10/2023 | Wang | ............... | G06F 16/24556 |
| | | | | 707/687 |

* cited by examiner

*Primary Examiner* — Bhavesh M Mehta
*Assistant Examiner* — Joseph J. Yamamoto
(74) *Attorney, Agent, or Firm* — MASCHOFF BRENNAN; Ran Pang; Liang Huang

(57)                ABSTRACT
A computer-implemented system to perform group entity identification, resolution and knowledge extraction is provided. The system receives an indication of one or more potentially related entities and basic attributes. The system then collects a plurality of content pages comprising candidate attribute data related to one or more candidate entities. Based on entity resolution configuration and entity-resolution module which employs deep-learning models, the system obtains initial additional confirmed entity attribute data or relevant attribute data. With additional knowledges acquired, the system iteratively goes over the same contents again and potentially classifies entities identified in the content pages to be at least confirmed, relevant, or irrelevant entities, until no more additional confident knowledges obtained for target entities during iteration. After iterations of entity resolution processes, the system finally extracts entity knowledge based on predefined knowledge map for individuals and business entities, summarization of knowledges for entities are then performed, results are displayed.

28 Claims, 12 Drawing Sheets

100

Figure 3:
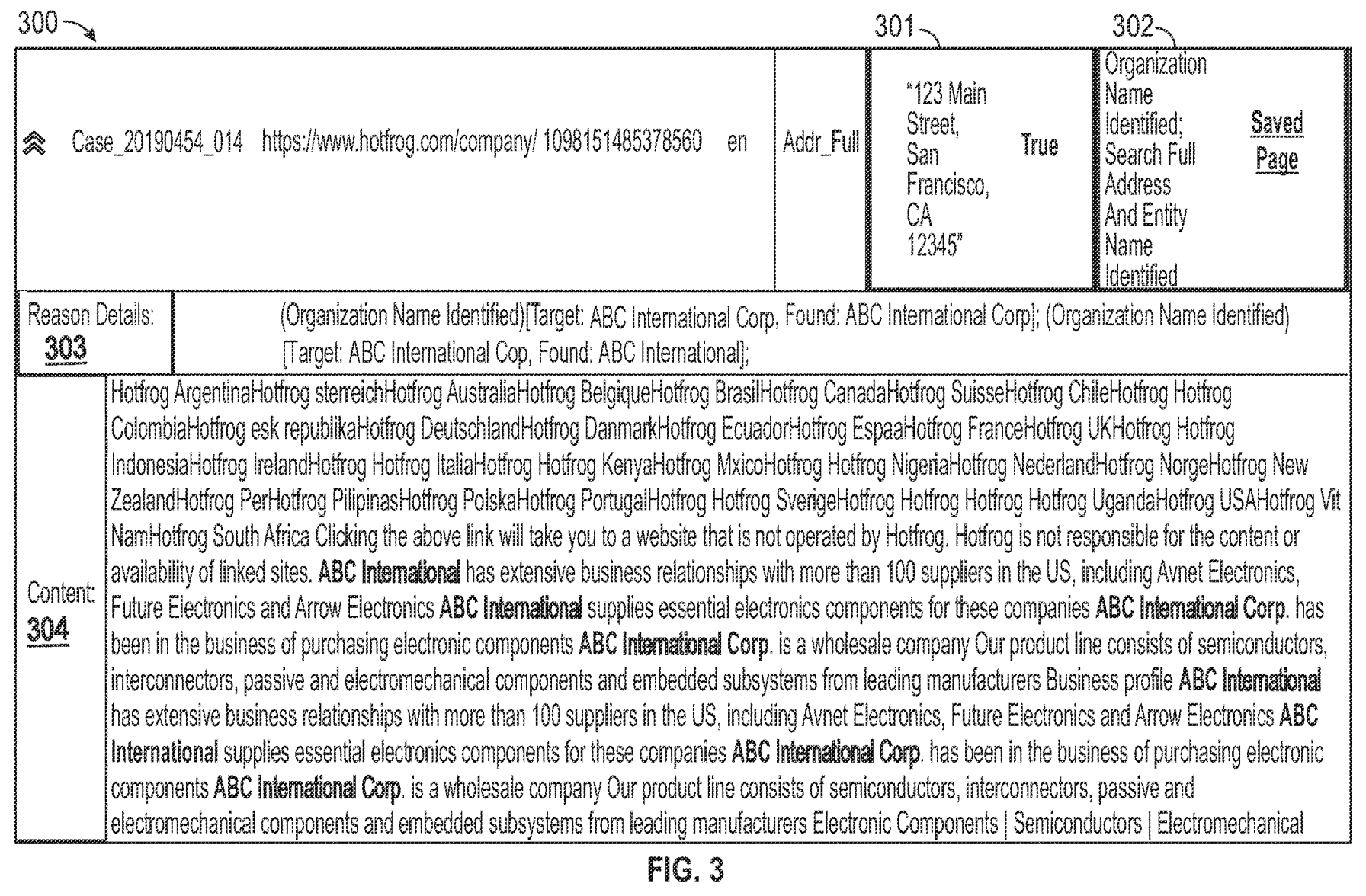

300

301   302

| « Case_20190454_014 | https://www.hotfrog.com/company/ 109815148537 8560 | en | Addr_Full | "123 Main Street, San Francisco, CA 12345" | True | Organization Name Identified; Search Full Address And Entity Name Identified |

Reason Details: 303

(Organization Name Identified)[Target: ABC International Corp. Found: ABC International Corp] (Organization Name Identified) [Target: ABC International Cop. Found: ABC International];

Content: 304

Hotfrog ArgentinaHotfrog sterreichHotfrog AustraliaHotfrog BelgiqueHotfrog BrasilHotfrog CanadaHotfrog SuisseHotfrog ChileHotfrog Hotfrog ColombiaHotfrog esk republikaHotfrog DeutschlandHotfrog DanmarkHotfrog EcuadorHotfrog EspaaHotfrog FranceHotfrog UKHotfrog Hotfrog IndonesiaHotfrog IrelandHotfrog Hotfrog ItaliaHotfrog Hotfrog KenyaHotfrog MxicoHotfrog NigeriaHotfrog NederlandHotfrog NorgeHotfrog New ZealandHotfrog PerHotfrog PilipinasHotfrog PolskaHotfrog PortugalHotfrog SverigeHotfrog Hotfrog UgandaHotfrog USAHotfrog Vit NamHotfrog South Africa Clicking the above link will take you to a website that is not operated by Hotfrog. Hotfrog is not responsible for the content or availability of linked sites. ABC International has extensive business relationships with more than 100 suppliers in the US, including Avnet Electronics, Future Electronics and Arrow Electronics ABC International supplies essential electronics components ABC International Corp. has been in the business of purchasing electronic components ABC International Corp. is a wholesale company Our product line consists of semiconductors, interconnectors, passive and electromechanical components and embedded subsystems from leading manufacturers Business profile ABC International has extensive business relationships with more than 100 suppliers in the US, including Avnet Electronics, Future Electronics and Arrow Electronics ABC International supplies essential electronics components for these companies ABC International Corp. has been in the business of purchasing electronic components ABC International Corp. is a wholesale company Our product line consists of semiconductors, interconnectors, passive and electromechanical components and embedded subsystems from leading manufacturers Electronic Components | Semiconductors | Electromechanical

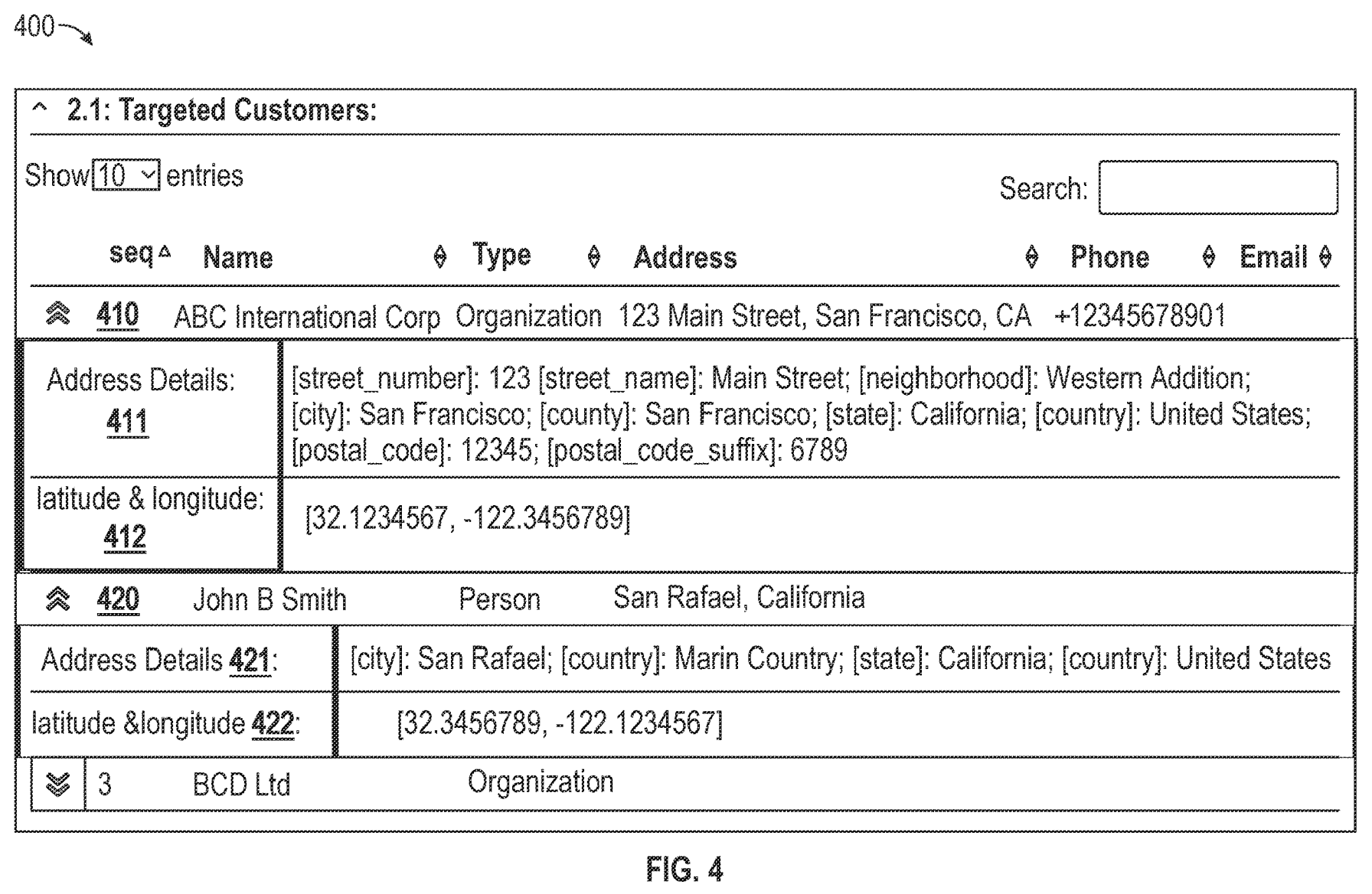

2.1: Targeted Customers:

Show [10 ▾] entries

Search: [          ]

| seq ▲ | Name | ◇ Type | ◇ Address | ◇ Phone | ◇ Email ◇ |
|---|---|---|---|---|---|
| « 410 | ABC International Corp | Organization | 123 Main Street, San Francisco, CA | +12345678901 | |

Address Details: 411

[street_number]: 123 [street_name]: Main Street; [neighborhood]: Western Addition; [city]: San Francisco; [county]: San Francisco; [state]: California; [country]: United States; [postal_code]: 12345; [postal_code_suffix]: 6789 latitude & longitude: 412

[32.1234567, -122.3456789]

| « 420 | John B Smith | Person | San Rafael, California | | |

Address Details 421:

[city]: San Rafael; [country]: Marin Country; [state]: California; [country]: United States latitude &longitude 422:

[32.3456789, -122.1234567]

| » 3 | BCD Ltd | | Organization | | |

FIG. 4

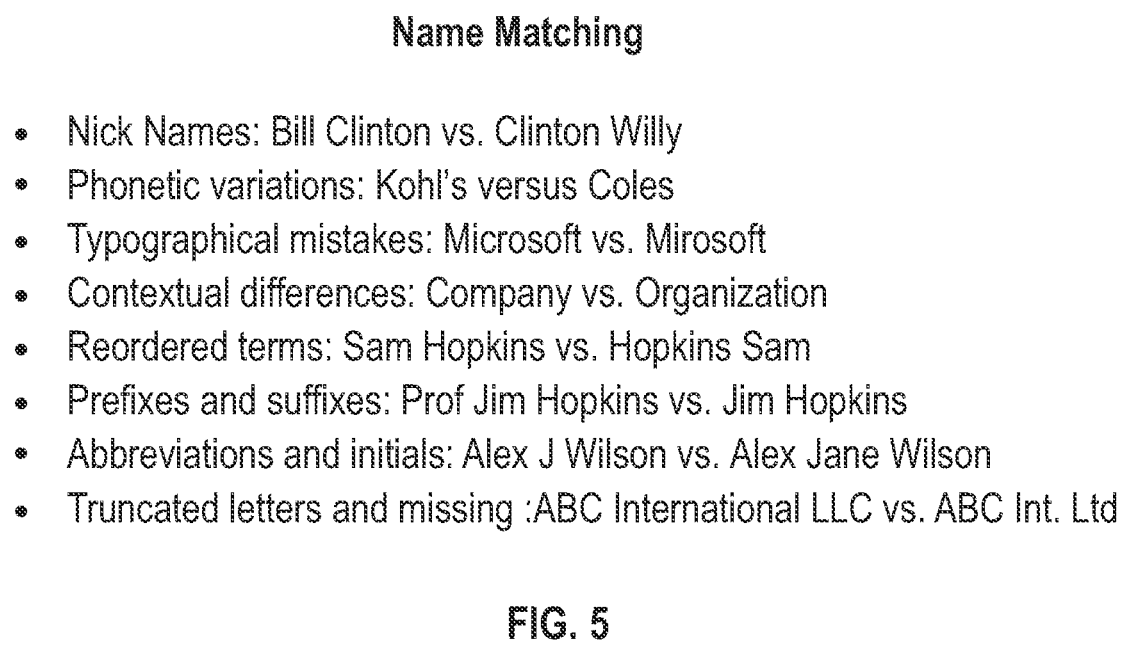

Name Matching

- Nick Names: Bill Clinton vs. Clinton Willy
- Phonetic variations: Kohl's versus Coles
- Typographical mistakes: Microsoft vs. Mirosoft
- Contextual differences: Company vs. Organization
- Reordered terms: Sam Hopkins vs. Hopkins Sam
- Prefixes and suffixes: Prof Jim Hopkins vs. Jim Hopkins
- Abbreviations and initials: Alex J Wilson vs. Alex Jane Wilson
- Truncated letters and missing :ABC International LLC vs. ABC Int. Ltd

FIG. 5

| Individual | Cross-Entity Attribute? (620) | Positive Flagging? (630) | Negative Flagging? (640) | ER score (650) | Exceptions (660) | |
|---|---|---|---|---|---|---|
| Attribute Types (610) | | | | | | |
| Name match (611) | Yes | | | 9 | | |
| Entity Info not used in Search | | | | | | |
| String at all | | Y | | | | |
| DOB (or Age within 1 year) | | Y | Y | | Age within 5 years | 3 |
| City or County | | Y | | | State/Country | 1 |
| Spouse NM | Yes | Y | | | | |
| Full Address | | | | | | |
| Email | | | | | | |
| Phone | | | | | | |
| Job Category | | | | | | |
| Company Worked | | | | | | |
| Company Owned | | | | | | |
| Group member of | | | | | | |
| Crime Type (Negative News Type) | | | | | | |
| | | | | | | |
| Thresholds (660) | | | | | | |
| Threshold - Relevant (661) | | | | 7 | | |
| Threshold - Confirmed (662) | | | | 9 | | |

FIG. 6

| Business | Cross-Entity Attribute? (720) | Positive Flagging? (730) | Negative Flagging? (740) | ER score (750) | Exceptions (760) | |
|---|---|---|---|---|---|---|
| Attribute Types (710) | | | | | | |
| Name match (711) | Yes | | | 5 | | |
| Entity Info not used in Search | | | | | | |
| String at all | | Y | | | | |
| Registration - Year/Month | | Y | Y | | | |
| Registration - City or State | | Y | Y | | | |
| HQ - State/Country | | Y | Y | | | |
| City or County (office) | | | | | | |
| Office full address | | | | | | |
| URL | | | | | | |
| Email | | | | | | |
| Phone | | | | | | |
| Owner or Manager Name | | | | | | |
| Product Type | | | | | Industry Type | 3 |
| Affiliate Name | | | | | | |
| Crime Type (Negative News Type) | | | | | | |
| Thresholds (760) | | | | | | |
| Threshold - Relevant (761) | | | | 5 | | |
| Threshold - Confirmed (762) | | | | 9 | | |

| Subject △ | Type ◇ | Intelligence Gained |
|---|---|---|
| Kenovetoo Ltd | Organization | The subject has $3,524,571 revenue/profit [1]. The subject appears related to ABC International [2]. |
| John B Smith 810 | Person | John B Smith, 65 year sold [1], was originally Russian [2]. The subject is associated with address Main Street [3] and Main Street in San Francisco's Western neighborhood [4] and San Francisco, CA [5], worked on following job, co-owner and operator [6]. The subject appears owned or managed ABC International Corporation, LLC [7], worked for related government agency Russia [8]. The subject is associated with ABC International Corp.[9] and My Life [10] [Crime][Negative News][Lawsuit]. John Smith appears involved in following criminal activity [Smuggling Crime and Money Laundering Crime]. Smuggling Goods, Conspiracy to Commit International Money Laundering, and Money Laundering [11], appears involved in following Negative News [Smuggling Crime and Money Laundering Crime], smuggling good and money laundering [12]. |
| ABC International Organization Corp 820 | Organization | ABC International Corp is registered in San Francisco, CA [1], in 1994 [2]. The subject appears engaged in Technology industry [electronic equipment] [3]. The subject is owned by John Smith [4], with $800,000.00 revenue/profit [5], office location at: Main Street in San Francisco's Western neighborhood [6]. The subject appears related to a freight forwarder in Estonia [7] and Smith Electronics [8] and John Bill Smith [9]. [Crime][Negative News][Lawsuit]. The subject appears involved in following criminal activity [Smuggling Crime], smuggling goods; conspiracy to commit international money laundering, and money laundering [10], appears involved in following Negative News [Smuggling Crime and Money Laundering Crime] allegedly smuggled electronic components that could be used for military purposes thought other countries into Russia [11], appears involved in following lawsuit: smuggling goods; conspiracy to commit international money laundering; and money laundering [12]. |

[1] Case_20191162_061   Source_Link   Saved Wed Page
...1662): BIS issued a 6-month Temporary Denial Order (TDO) against the following person: Smith Electronics, LLC, a/k/a Smith Electronics, d/b/a ABC International Corporation, LLC, d/b/a ABC International Corporation (ABC), San Francisco, CA, John Bill Smith, a/k/a John Smith, a Russian national and naturalized U.S. citizen, of San Rafael, CA, and Gennadiy Bill Smith, a/k/a Gennadiy Smith, San Francisco, CA,....

[2] Case_20191162_001   Source_Link   Saved Wed Page
...CLAIM THIS Business 123 MAIN ST SAN Francisco, CA 12345 Get Directions (123) 5678-9012 Business info Founder 1994 Incorporated Annual Revenue $800,000.00 Employee Count 4 Industries Wholesale - Semiconductor Devices Contacts John Smith Contact Business Your Email Address Subject: Message Send Message Company Summary ABC International Corp. was founded in 1994, and is located at 123 Main Street San Francisco....

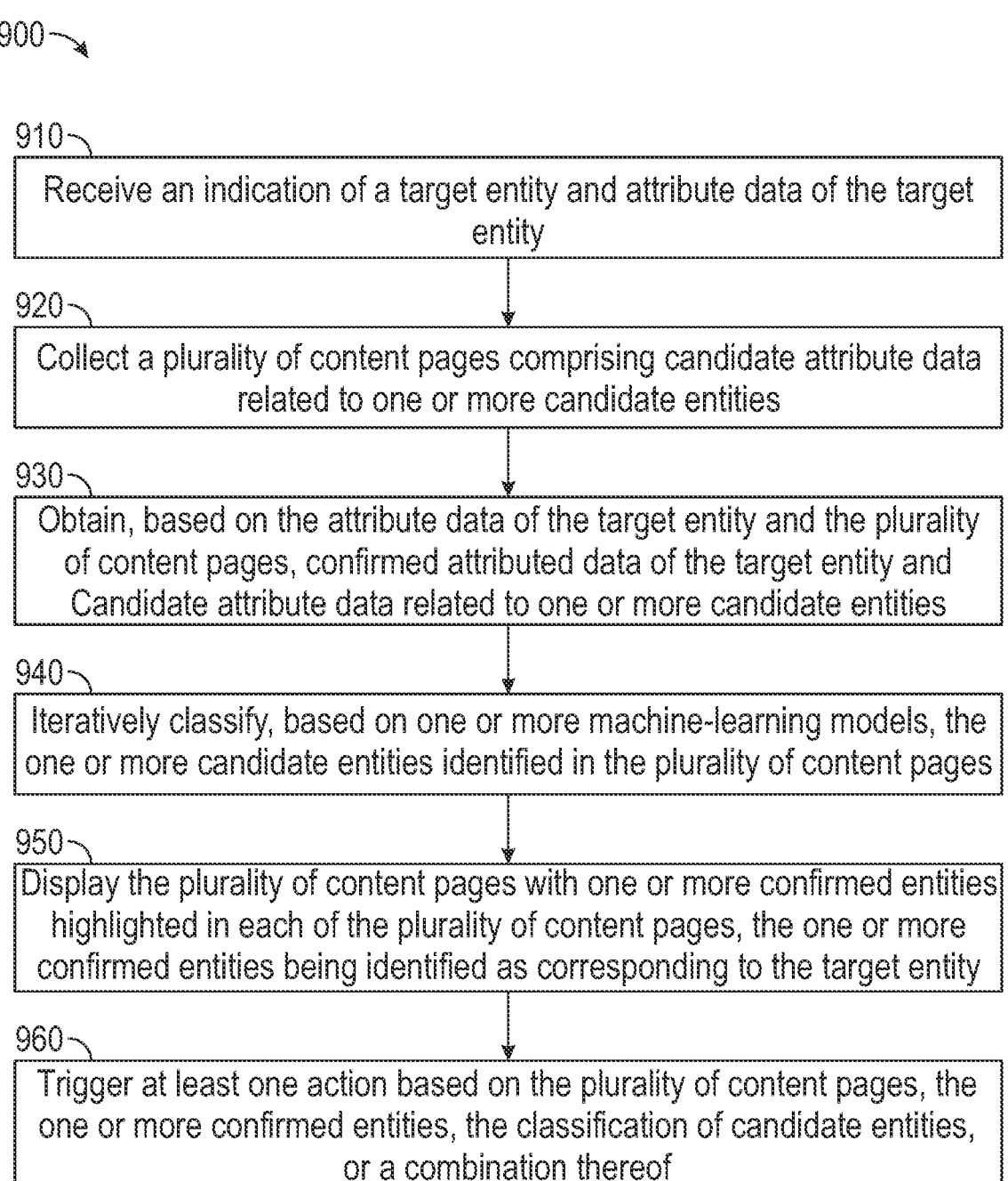

900

910

Receive an indication of a target entity and attribute data of the target entity

920

Collect a plurality of content pages comprising candidate attribute data related to one or more candidate entities

930

Obtain, based on the attribute data of the target entity and the plurality of content pages, confirmed attributed data of the target entity and Candidate attribute data related to one or more candidate entities

940

Iteratively classify, based on one or more machine-learning models, the one or more candidate entities identified in the plurality of content pages

950

Display the plurality of content pages with one or more confirmed entities highlighted in each of the plurality of content pages, the one or more confirmed entities being identified as corresponding to the target entity

960

Trigger at least one action based on the plurality of content pages, the one or more confirmed entities, the classification of candidate entities, or a combination thereof

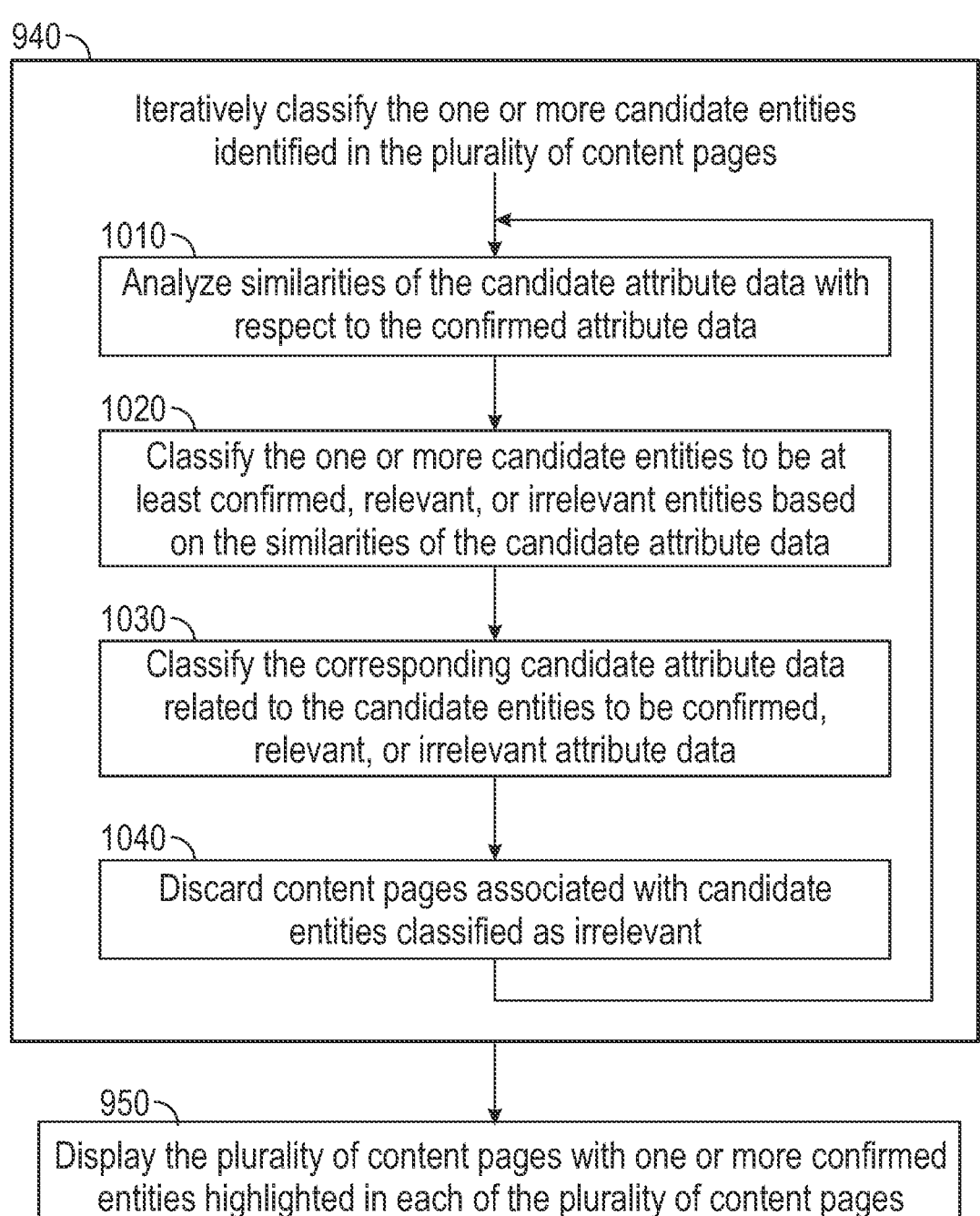

940

Iteratively classify the one or more candidate entities
identified in the plurality of content pages

1010

Analyze similarities of the candidate attribute data with
respect to the confirmed attribute data

1020

Classify the one or more candidate entities to be at
least confirmed, relevant, or irrelevant entities based
on the similarities of the candidate attribute data

1030

Classify the corresponding candidate attribute data
related to the candidate entities to be confirmed,
relevant, or irrelevant attribute data

1040

Discard content pages associated with candidate
entities classified as irrelevant

950

Display the plurality of content pages with one or more confirmed
entities highlighted in each of the plurality of content pages

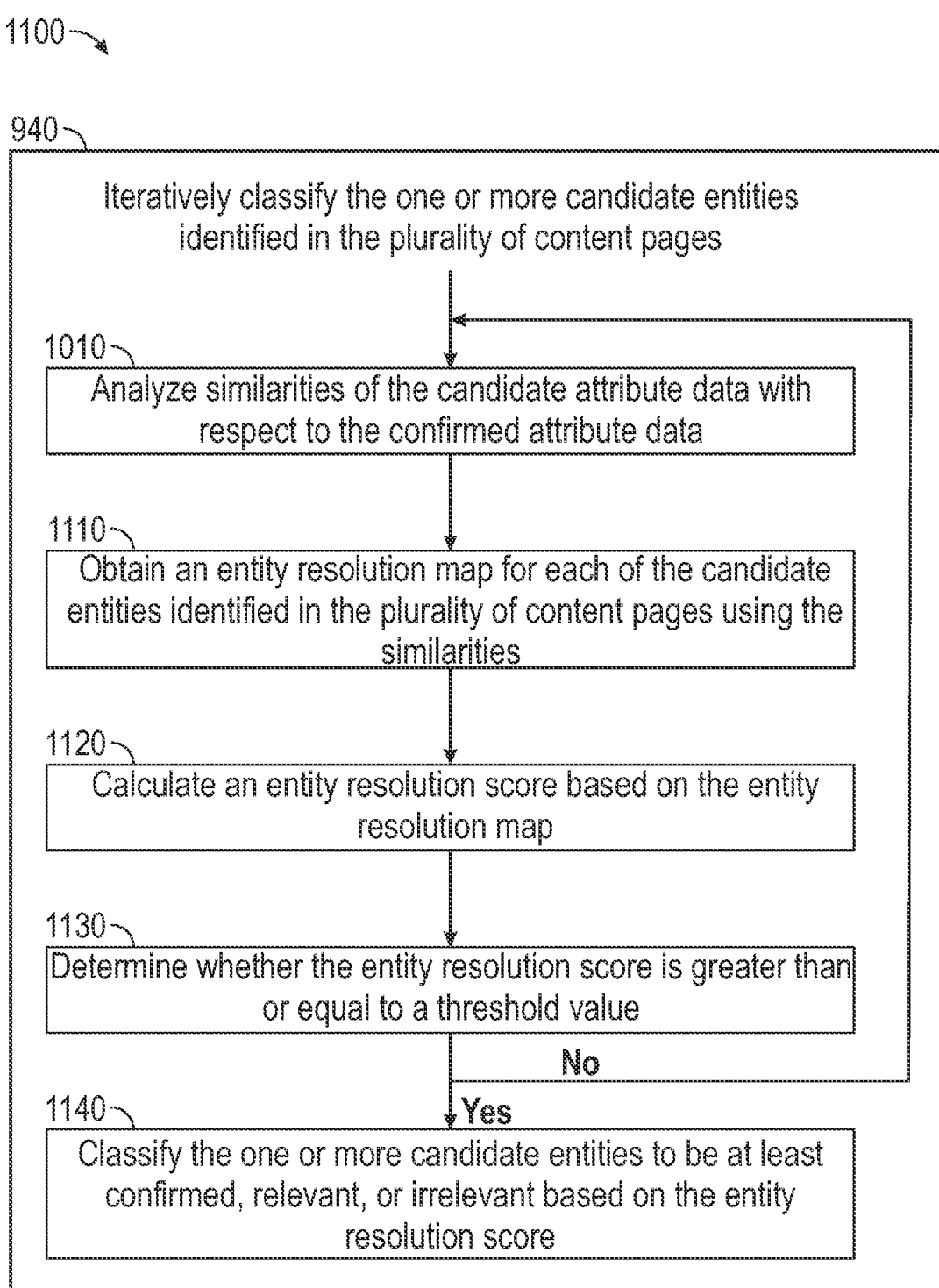

940

Iteratively classify the one or more candidate entities identified in the plurality of content pages

1010

Analyze similarities of the candidate attribute data with respect to the confirmed attribute data

1110

Obtain an entity resolution map for each of the candidate entities identified in the plurality of content pages using the similarities

1120

Calculate an entity resolution score based on the entity resolution map

1130

Determine whether the entity resolution score is greater than or equal to a threshold value No

1140

Yes

Classify the one or more candidate entities to be at least confirmed, relevant, or irrelevant based on the entity resolution score

COMPUTER-IMPLEMENTED SYSTEM AND METHOD TO PERFORM NATURAL LANGUAGE PROCESSING ENTITY RESEARCH AND RESOLUTION

CROSS-REFERENCE TO RELATED APPLICATIONS

This application claims priority to U.S. Provisional Patent Application Ser. No. 63/339,930, filed May 9, 2022, entitled "A Novel Solution using AI Machine to Perform Compliance Research" the content of which is hereby incorporated by reference in its entirety for all purposes.

FIELD

The present disclosure relates generally to technologies in artificial intelligence (AI), deep learning, and natural language processing (NLP), more specifically, to computer-implemented systems and methods to perform entity resolution using NLP technologies.

BACKGROUND

In various applications, target entities often need to be searched from multiple databases, verified, and/or resolved by using a resource intensive and time-consuming process. This entity analysis process may be prone to errors, because it involves a lot of repetitive and tedious tasks. In addition, the processes cannot be audited. For example, when an indication comprising target entities is received by a computing device operated by a human researcher, the human researcher uses the computing device to research and identify the target entities that may be involved in an alerted case in the indication and digests knowledge of the target entities from the indication. The human researcher then instructs the computing device to perform searches for each of the target entities, reads each of content pages searched from websites, and identifies one or more target entities if the one or more target entities are present in the content pages. Once the one or more target entities are identified in the content pages, the human researcher obtains knowledge of the target entities. Based on the obtained knowledge of the target entities from the content pages, the human researcher may need to instruct the computing device to perform additional search on public or private databases, read additional content pages to identify the one or more target entities, and obtain additional knowledge of the one or more target entities, until the human researcher can assess the alerted case in the indication based on enough knowledge of the one or more target entities.

Obtaining knowledge of the target entities by humans is a time-consuming process and prone of errors, especially when a typical computing device is not configured to perform such an entity analysis process. This is because knowledge of entities is miscellaneous and can be complicated, and normally unstructured in content pages. Therefore, it is difficult, time-consuming, and sometimes impractical to use a typical computing device to extract the knowledge from unstructured texts from each of the unstructured content pages. In comparison, however, the final step of assessing the alerted case in the indication does not require much time and can be straightforward, if the obtained knowledge of the target entities is sufficient and accurate. Therefore, there is a need to improve the performance (e.g., speed, accuracy, reliability, error rate, etc.) and efficiency of computing devices used for obtaining knowledge of the target entities, and thereby reducing the resource intensities and overall costs for entity resolution.

Further, different human researchers using different computing devices may behave differently when obtaining knowledges of the target entity and performing an entity analysis process. For example, different researchers may determine different entities as target entities involved in an alerted case in a same indication. Different researchers may use different knowledge of entities while performing searches in public and private databases. Different researchers may obtain different knowledge of entities in content pages which may lead to different decisions for accessing the alerted case in the same indication. Due to individual performance differences in processes of searching, identifying target entities in content pages, and obtaining knowledges of the target entity, these processes are not reproducible even when the same computing device is used and therefore cannot be audited. Also, it is difficult to inspect errors and troubleshoot the errors in a lot of repetitive processes. Therefore, there is a need to standardize the processes of entity analysis by enhancing the capabilities of the computing devices in the process, thereby improving overall performance of the computing devices in such a process.

SUMMARY

Various systems, methods, and articles of computer-implemented systems and methods to perform entity resolution are described herein.

In some embodiments, a computer-implemented system configured to perform an entity analysis process is provided. The technologies disclosed herein improves the accuracy of the process performed by the computer-implemented system, reduces or eliminates random human or computer errors, increases the speed of performing the process, achieving a consistent and accurate performance, and providing a cost-efficient solution. The system receives an indication of at least one target entity and attribute data of the target entity, and collects a plurality of content pages comprising candidate attribute data related to one or more candidate entities. The system obtains confirmed attributed data and candidate attribute data based on the attribute data of the target entity and the plurality of content pages. Based on one or more machine-learning models, the system iteratively classifies the one or more candidate entities identified in the plurality of content pages. In a plurality of iterations, the system analyzes similarities of the candidate attribute data with respect to the confirmed attribute data, classifies the one or more candidate entities to be at least confirmed, relevant, or irrelevant entities based on the similarities of the candidate attribute data, classifies the corresponding candidate attribute data related to the candidate entities to be confirmed, relevant, or irrelevant attribute data, and discards content pages associated with candidate entities classified as irrelevant. In some embodiments, content pages are classified as a result of classifying a candidate entity, and once the content page receives a flag because a confirmed entity has been identified, the content page can be marked as "confirmed", and all candidate entities present in the content can have a flag as "confirmed" entities right away, and confirmed knowledge can be extracted from all those candidates from this confirmed content. After the plurality of iterations, the system displays the plurality of content pages with one or more confirmed entities highlighted in each of the plurality of content pages. The one or more confirmed entities are identified as corresponding to the at least one target entity.

The system further triggers at least one action based on the plurality of content pages, the one or more confirmed entities, the classification of candidate entities, or a combination thereof.

In some embodiments, a computer-implemented method to perform an entity analysis process is provided. By using the method, the performance (e.g., accuracy and speed) of the computing device configured to perform the process is improved. The method includes receiving an indication of a target entity and attribute data of the target entity, collecting a plurality of content pages comprising candidate attribute data related to one or more candidate entities, and obtaining confirmed attributed data of the target entity and candidate attribute data related to one or more candidate entities based on the attribute data of the target entity and the plurality of content pages. The method further includes iteratively classifying the one or more candidate entities identified in the plurality of content pages based on one or more machine-learning models. During a plurality of iterations, the following steps are performed: analyzing similarities of the candidate attribute data with respect to the confirmed attribute data, classifying the one or more candidate entities to be at least confirmed, relevant, or irrelevant entities based on the similarities of the candidate attribute data, classifying the corresponding candidate attribute data related to the candidate entities to be confirmed, relevant, or irrelevant attribute data, and discarding content pages associated with candidate entities classified as irrelevant. After the plurality of iterations, the method further comprises steps of displaying the plurality of content pages with one or more confirmed entities highlighted in each of the plurality of content pages, and triggering at least one action based on the plurality of content pages, the one or more confirmed entities, the classification of candidate entities, or a combination thereof. The one or more confirmed entities are identified as corresponding to the target entity.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 3 illustrates an example of a content page with one or more confirmed entities highlighted in accordance with some embodiments.

FIG. 4 illustrates an example of customer information comprising geographic data in accordance with some embodiments.

FIG. 5 illustrates examples of name matching in accordance with some embodiments.

FIG. 6 illustrates an example of an entity resolution configuration in accordance with some embodiments.

FIG. 7 illustrates another example of an entity resolution configuration in accordance with some embodiments.

FIG. 8 illustrates an example of a summarization map in accordance with some embodiments.

FIG. 9 illustrates an exemplary process for performing an entity analysis process in accordance with some embodiments.

FIG. 10 illustrates an exemplary process of iteratively classifying candidate entities in accordance with some embodiments.

FIG. 11 illustrates an exemplary process of classifying candidate entities to be confirmed, relevant, or irrelevant in accordance with some embodiments.

DETAILED DESCRIPTION

Figure 1:
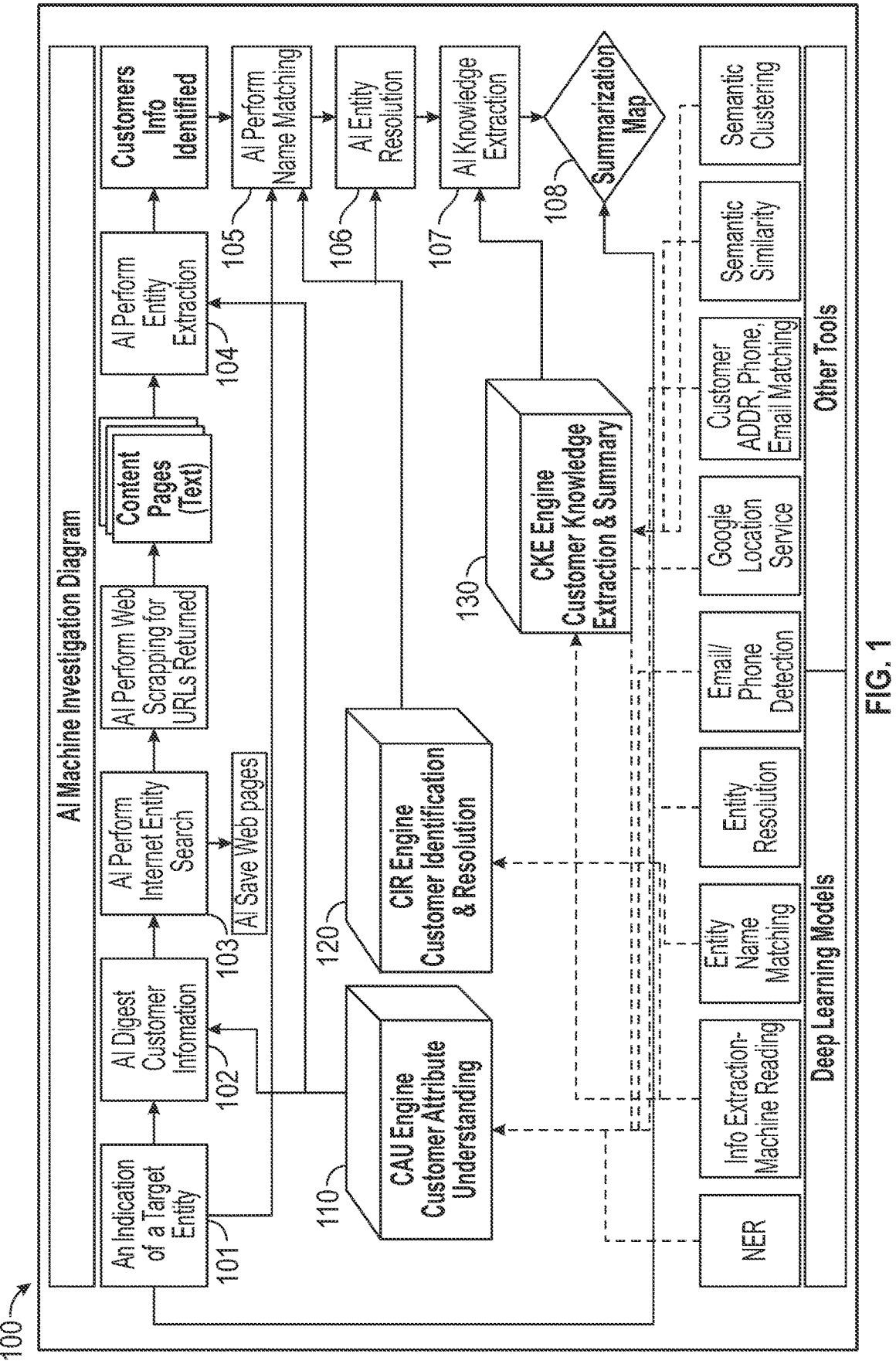
FIG. 1 illustrates an example of a computer-implemented system to perform one or more machine-learning based entity analysis processes in accordance with some embodiments.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

In various applications, target entities often need to be searched from multiple databases, verified, and/or resolved by using a resource intensive and time-consuming process. This entity analysis process may be prone to errors, because it involves a lot of repetitive and tedious tasks. In addition, the processes cannot be audited. For example, when an indication comprising target entities is received by a computing device operated by a human researcher, the human researcher uses the computing device to research and identify the target entities that may be involved in an alerted case in the indication and digests knowledge of the target entities from the indication. The human researcher then instructs the computing device to perform searches for each of the target entities, reads each of content pages searched from websites, and identifies one or more target entities if the one or more target entities are present in the content pages. Once the one or more target entities are identified in the content pages, the human researcher obtains knowledge of the target entities. Based on the obtained knowledge of the target entities from the content pages, the human researcher may need to instruct the computing device to perform additional search on public or private databases, read additional content pages to identify the one or more target entities, and obtain additional knowledge of the one or more target entities, until the human researcher can assess the alerted case in the indication based on enough knowledge of the one or more target entities.

Obtaining knowledge of the target entities by humans is a time-consuming process and prone of errors, especially when a typical computing device is not configured to perform such an entity analysis process. This is because knowledge of entities is miscellaneous and can be complicated, and normally unstructured in content pages. Therefore, it is difficult, time-consuming, and sometimes impractical to use a typical computing device to extract the knowledge from unstructured texts from each of the unstructured content pages. In comparison, however, the final step of assessing the alerted case in the indication does not require much time and can be straightforward, if the obtained knowledge of the target entities is sufficient and accurate. Therefore, there is a need to improve the performance (e.g., speed, accuracy, reliability, error rate, etc.) and efficiency of computing devices used for obtaining knowledge of the target entities, and thereby reducing the resource intensities and overall costs for entity resolution.

Further, different human researchers using different computing devices may behave differently when obtaining knowledges of the target entity and performing an entity analysis process. For example, different researchers may determine different entities as target entities involved in an alerted case in a same indication. Different researchers may use different knowledge of entities while performing searches in public and private databases. Different researchers may obtain different knowledge of entities in content pages which may lead to different decisions for accessing the alerted case in the same indication. Due to individual performance differences in processes of searching, identifying target entities in content pages, and obtaining knowledges of the target entity, these processes are not reproducible even when the same computing device is used and therefore cannot be audited. Also, it is difficult to inspect errors and troubleshoot the errors in a lot of repetitive processes. Therefore, there is a need to standardize the processes of entity analysis by enhancing the capabilities of the computing devices in the process, thereby improving overall performance of the computing devices in such a process.

With the development of technologies in artificial intelligence (AI), deep learning, natural language processing (NLP), and robotics, AI machines configured to perform complex processes have been used in workplaces, and achieved benefits of consistent performance, improved time-efficiency and free of human errors. However, machine learning technologies have not been widely used in entity analysis processes including customer attributes understanding, entity extraction, name matching, entity resolution, and knowledge extraction. Embodiments discussed herein improve the performance for an entity analysis and verification process by using a computer-implemented system customized to perform such a process. Specifically, using the technologies disclosed herein, a fast processing speed can be achieved, thereby significantly reducing overall costs of performing such a process. For example, the processing speed of the system can be eight times (or higher) faster than that made by human operators using a traditional computing device. Moreover, the performance of the entity analysis and verification process by using the computer-implemented system can be more consistent, accurate, and free of random human error. Also, processes are controlled and monitored by the computer-implemented system and are friendly to auditing.

Embodiments of present invention are described below. In various embodiments of the present invention, a computer-implemented system to perform entity analysis and verification is provided. The system receives an indication of at least one target entity and attribute data of the target entity, and collects a plurality of content pages comprising candidate attribute data related to one or more candidate entities. The system obtains confirmed attributed data and candidate attribute data based on the attribute data of the target entity and the plurality of content pages. Based on one or more machine-learning models, the system iteratively classifies the one or more candidate entities identified in the plurality of content pages. In a plurality of iterations, the system analyzes similarities of the candidate attribute data with respect to the confirmed attribute data, classifies the one or more candidate entities to be at least confirmed, relevant, or irrelevant entities based on the similarities of the candidate attribute data, classifies the corresponding candidate attribute data related to the candidate entities to be confirmed, relevant, or irrelevant attribute data, and discards content pages associated with candidate entities classified as irrelevant. After the plurality of iterations, the system displays the plurality of content pages with one or more confirmed entities highlighted in each of the plurality of content pages. The one or more confirmed entities are identified as corresponding to the at least one target entity. The system further triggers at least one action based on the plurality of content pages, the one or more confirmed entities, the classification of candidate entities, or a combination thereof.

FIG. 1 shows an example of computer-implemented system 100 to perform an entity analysis and verification process in accordance with some embodiments. In the example, the system 100 comprises a customer attribute understanding (CAU) engine 110, a customer identification and resolution (CIR) engine 120, and a customer knowledge extraction and summary (CKE) engine 130. Each of the engines 110, 120, and 130 can be implemented using a device 1200 illustrated in FIG. 12.

As shown in FIG. 1, the CAU engine 110 is a computer-implemented engine configured to obtain attribute data by digesting customer information in an indication or content pages. A customer can be an individual entity or a business entity. The customer information comprises attribute data of one or more entities. In some embodiments, as for an individual entity, attribute data of an individual entity may comprise name, age, address, contact information and family members or relatives of the individual entity, negative news or crime activity related to the individual entity and so on. In some embodiments, as for a business entity, attribute data of a business entity may comprise name of the business entity, owner or manager names, registration information, office address, industry type, product or service type, affiliates, negative news or lawsuit related to the business entity and so on. In some embodiments, the CAU engine 110 is configured to understand customer information, and is configured to digest the indication or the content pages by performing at least one of the following steps: separating entities by pipelines "|", extracting names and address information of entities by using a natural entity recognition (NER) deep learning model or machine question-answering (QA) deep learning model, and extracting phone numbers and emails by using a email/phone detection python program (e.g., pattern recognition model) and performing data standardization for the phone numbers and emails. In addition, the CAU engine 110 is configured to parse address information to obtain geographic data, such as street name, city name, and postal code. Based on the obtained geographic data, the CAU engine 110 can obtain corresponding latitude-longitude coordinate data of the geographic data by using, for example, a location application programming interface (API) service. The CAU engine 110 identifies address information by using an information extraction deep learning model. Such an information extraction deep learning model can be based on, for example, NER deep learning model, machine QA deep learning model, recurrent neural networks (RNNs) models, hidden markov models (HMM) and conditional random fields (CRF) models, universal language model fine-tuning (ULMfit), embeddings from language models (ELMo) and texts vectorization models, such as term frequency-inverse document frequency (TF-IDF) vectorizer, word2vec, GloVe, or bidirectional encoder representations from transformers (BERT) models.

In step 101 of FIG. 1, the system 100 receives an indication of at least one target entity and attribute data of the target entity. In some embodiments, the indication of the at least one target entity comprises an alerted case that the target entity may involve. For example, the alerted case is a transaction comprising an entity name, an address information, a phone number, and so on. In step 102, the CAU engine 110 obtains attribute data of the target entity as confirmed attribute data by using the NER deep learning model or the pattern recognition model to digest the indication of the target entity.

In step 103, the system 100 collects a plurality of content pages comprising candidate attribute data related to one or more candidate entities. In some embodiments, the system 100 performs the collection by sending one or more search strings to a search API. The one or more search strings are from a list of search strings prepared by the CAU engine 110. Each of the search strings comprises one or more attribute data of the target entity obtained by the CAU engine 110. In some examples, the search API includes a Google™ search API, a Microsoft™ Bing™ search API, a LexisNexis™ API, or the like. In return, the system 100 receives a plurality of uniform resource locators (URLs) for each API search action. In some embodiments, the system 100 processes the plurality of URLs into the plurality of content pages by performing the following steps: consolidating the plurality of URLs, extracting content (e.g., text) from each of the plurality of URLs by using Python program for web scrapping, and transforming each content into a content page in an image format. The plurality of content pages are stored in a folder for future reference. In some embodiments, the plurality of content pages are in a text format. In step 104, the CAU engine 110 obtains the candidate attribute data related to the one or more candidate entities by using the NER deep learning model or the pattern recognition model to digest the plurality of content pages.

The CIR engine 120 is another computer-implemented engine configured to perform entity identification and resolution for each of the candidate entities. In some embodiments, the CIR engine 120 comprise an entity-resolution (ER) module. As mentioned before, obtaining customer knowledge of the target entities by human researchers is a time-consuming process and prone to human errors. For example, about 90% of time in entity analysis and verification performed by human researchers is spent on reading unstructured text in content pages to identify or recognize target entities and extract knowledge of the target entities. To improve speed and accuracy of obtaining customer knowledge, based on one or more machine-learning models, the CIR engine 120 iteratively classifies the candidate entities to be at least confirmed, relevant, or irrelevant entities. In some embodiments, the CIR engine 120 iteratively classifies, based on classifying a candidate entity, each content page to be at least confirmed, relevant, or irrelevant. This is described in detail further below with reference to FIG. 2. After the plurality of iterations, the confirmed entities are highlighted in each of the plurality of content pages as described further below with reference to FIG. 3. The one or more confirmed entities are identified as corresponding to the target entity. This is an advantage compared to the conventional entity analysis and verification process performed by human researchers described above.

In some embodiments, steps 105 and 106 in FIG. 1 are exemplary steps performed during the plurality of iterations for classifying the candidate entities and the candidate attribute data. In step 105, if the attribute data comprise individual names or business names, the CIR engine 120 performs a name matching process to analyze similarities of the candidate names with respect to the confirmed names. After the name matching process, the CIR engine 120 can determine whether the target entity is present in the plurality of contents pages. In some embodiments, the name matching comprises individual name matching and business name matching. The name matching process is based on at least one of a pre-trained NLP deep learning model or a fuzzy matching deep learning model. In some embodiments, the CIR engine 120 can identify at least one of names comprising nick names, phonetic variations, typographical mistakes, contextual differences, reordered terms, prefixes and suffixes, abbreviations and initials, or truncated letters and missing as matched names. As a result, the CIR engine 120 enables the system 100 to achieve and exceed the human-level performance of the entity analysis and verification process.

In step 106, the CIR engine 120 performs an entity resolution for classifying the one or more candidate entities identified in the plurality of content pages. In some embodiments, during a plurality of iterations, the CIR engine 120 classifies the one or more candidate entities to be at least confirmed, relevant, or irrelevant.

The CKE engine 130 is another computer-implemented engine configured to extract customer knowledge and summarize the customer knowledge using a summarization map. In step 107, the CKE engine 130 performs customer knowledge extraction by using at least one information extraction deep learning model. In some embodiments, the customer knowledge includes confirmed attribute data or relevant attribute data. In some embodiments, the irrelevant attribute data are determined as noise and not for future use.

In step 108, the CKE engine 130 generates a summarization map for the candidate entities. In some embodiment, for generating the summarization map, the CKE engine 130 predicts relevance for the candidate attribute data related to the candidate entities. The relevance for the candidate attribute data is predicted based on the classification of the candidate entities. In some embodiment, the CKE engine 130 predicts relevance for the candidate attribute data by performing an information similarity evaluation using a semantic similarity model. The semantic similarity model attempts to compare two texts and decide whether they are similar in meaning. may be based on, for example, Stanford natural language inference (SNLI), bidirectional encoder representations from transformers (BERT), a transformer model and using a similarity metric (e.g., cosine similarity). Based on the predicted relevance, the CKE engine 130 extracts most relevant attribute data for the candidate entities using at least one information extraction deep learning model, such as the machine QA deep leaning model. The machine QA deep leaning model can answer questions by extracting phrases from paragraphs, paraphrasing answers generatively, or choosing one option out from a list of given options. The CKE engine 130 summarized the most relevant attribute data for each of the candidate entities in the summarization map using an information semantic clustering model. In some embodiments, the most relevant attribute data for each of the candidate entities are highlighted in the summarization map. The summarization map is provided in a format that is friendly to review.

By using the system 100 to perform entity analysis and verification, the processing speed can be improved. The average processing speed of the system 100 can be eight times (or more) faster than that made by human researchers. Moreover, the performance of system 100 configured to perform an entity analysis and verification process is more consistent, accurate, and without random human error.

Figure 2:
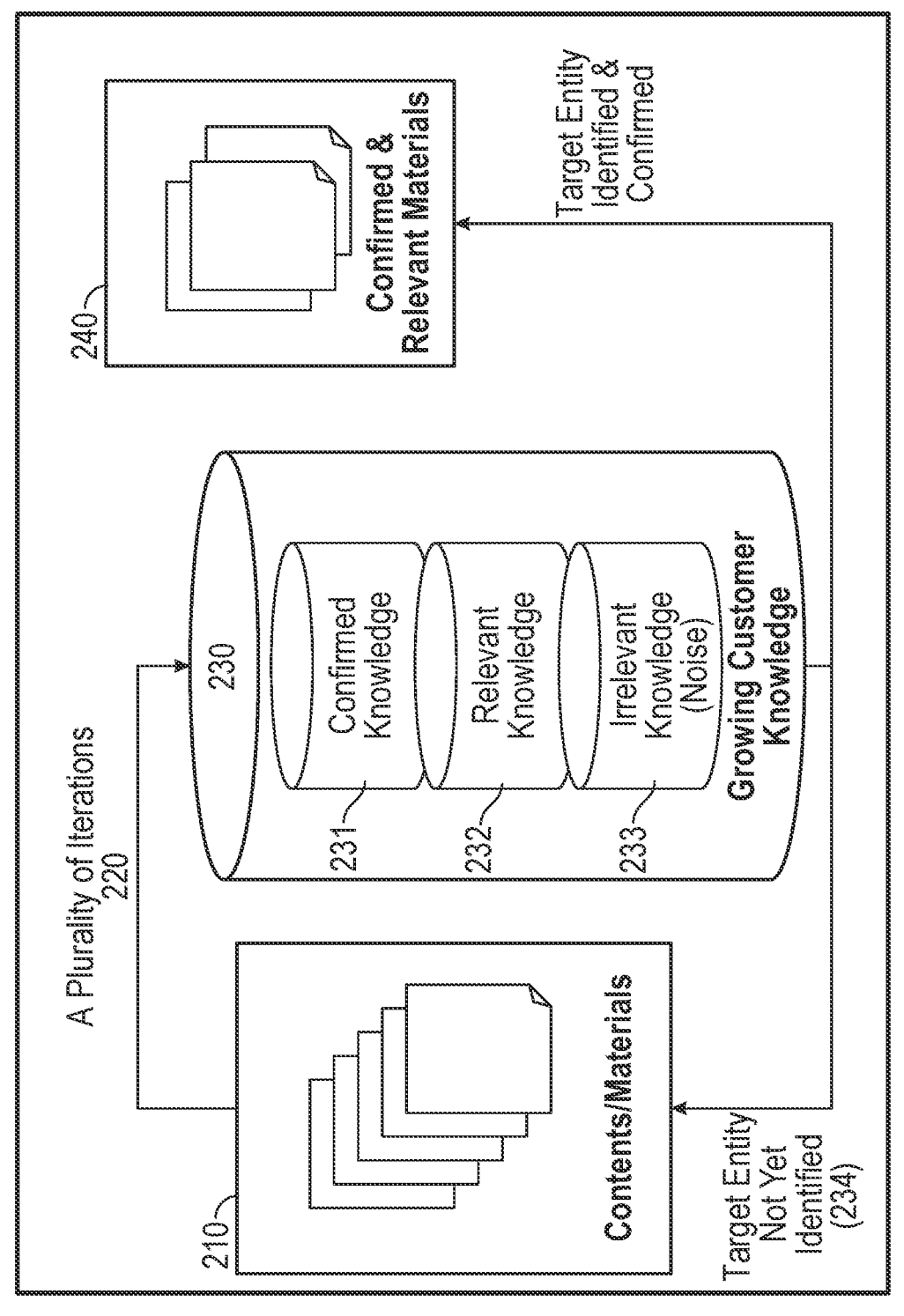
FIG. 2 illustrates an example of iteratively classifying candidate entities in content pages in accordance with some embodiments.

FIG. 2 illustrates an example of iteratively classifying the candidate entities in accordance with some embodiments. As shown in steps 102 and 104 FIG. 1, the system 100 obtains confirmed attributed data of the target entity and candidate attribute data related to one or more candidate entities. In some embodiments, the system 100 further generates a confirmed database configured to store confirmed attribute data and a candidate database configured to store candidate attribute data.

As shown in FIG. 2, the system 200 (e.g., computer-implemented system 100 in FIG. 1) iteratively classifies one or more candidate entities identified in a plurality of content pages 210. During a plurality of iterations 220, the system 200 analyzes similarities of the candidate attribute data with respect to the confirmed attribute data. In some embodiments, during a first iteration, the confirmed attribute data is attribute data of the target entity obtained from the indication 101 (shown in FIG. 1). Based on the similarities of the candidate attribute data, the system 200 classifies the one or more candidate entities to be at least confirmed, relevant, or irrelevant entities, and classifies the corresponding candidate attribute data related to the candidate entities to be confirmed, relevant, or irrelevant attribute data. The confirmed entities are identified as corresponding to the at least one target entity. In some embodiments, the system 200 classifies the content page to be confirmed, relevant, or irrelevant, based on classifying of a candidate entity. For instance, if a candidate entity is classified as confirmed, the entire corresponding content page may be classified as confirmed.

As illustrated in FIG. 2, the system 200 extracts the corresponding candidate attribute data related to the candidate entities in a knowledge database 230. In each of the plurality of iterations 220, for candidate entities classified to be confirmed entities, the system 200 extracts corresponding candidate attribute data related to the confirmed entities as confirmed knowledge 231. In some embodiments, the system 200 moves the candidate attribute data classified as confirmed attribute data from the candidate database to the confirmed database. Therefore, the confirmed attribute data accumulates in the confirmed database during the plurality of the iterations 220. For candidate entities classified to be relevant entities, the system 200 extracts corresponding candidate attribute data related to the relevant candidate entities as relevant knowledge 232. The content pages 210 associated with the relevant candidate entities are kept in the folder and will be processed in the next iteration. The folder is the original folder configured to store the plurality of content pages described above in step 103 in FIG. 1. As for candidate entities classified to be irrelevant entities, the system 200 discards content pages 210 associated with candidate entities classified as irrelevant candidate entities. In some embodiments, the system 200 extracts corresponding candidate attribute data related to the irrelevant candidate entities as irrelevant knowledge 233, and determines the irrelevant knowledge to be noise and not considered for future use. In some embodiments, the system 200 discards content pages that are classified as irrelevant without extraction candidate attribute data. As a result, the knowledge database 230 grows dynamically through the plurality of iterations 220. Also, as shown in FIG. 2, confirmed and relevant materials 240 comprising extracted confirmed knowledge 231 and relevant knowledge 232 can be selected from the plurality of content pages 210 for further uses in knowledge extraction 107 and generating a summarization map 108 (shown in FIG. 1).

As the knowledge database 230 grows dynamically through the plurality of iterations 220, confirmed knowledge 231 and relevant knowledge 233 accumulate. The more confirmed knowledge 231 and relevant knowledge 232, the more accurate classification for the one or more candidate entities in a next iteration. For example, the system 200 may not be able to determine whether a candidate entity matches with the target entity with only an individual name (e.g., John B. Smith) identified in a content page. In one example, by using the iterative classification approach, the system 200 may classify the candidate entity as a relevant entity in the first iteration. The content page associated with the candidate entity is kept in the folder and not discarded. In the second iteration or further iterations, as the knowledge accumulate, the system 200 classifies the candidate entity as confirmed due to a new extracted confirmed knowledge (e.g., name of a business organization, such as ABC Corp., as a counterparty of the target entity.).

As shown in FIG. 2, if the target entity is not yet identified (234) in a content page, the content pages are kept in the folder and will be processed in the next iteration, rather than discarded. The folder is the original folder configured to store the plurality of content pages described above in step 103 in FIG. 1. In the next iteration, candidate entity in this content page may be classified as confirmed entity or relevant entity. Therefore, the accuracy for classifying candidate entities is improved by using the iterative classification approach. In another example, an individual person's name (e.g., John B. Smith) appears in a content page, but there may not be any address information of the individual person in the content page. Without an iterative approach, one may not be able to determine that the individual person matches the target entity and may just ignore the content page. By using the iterative classification approach, however, the system 200 keeps the content page in the folder for a next iteration processing, because the candidate entity (e.g., the individual person) cannot be identified in the content page. During the second or later iteration, the system 200 is able to classify the candidate entity (e.g., John B. Smith) as a confirmed entity, because, for example, the system 200 acquired another knowledge of the individual person's crime activity obtained from another content page. This another content page may be obtained during the first iteration or at other iterations.

During the plurality of iterations 220, the system 200 performs an entity resolution for each of the candidate entities by using an entity resolution (ER) map (not shown in FIG. 2). The ER map is obtained for each of the candidate entities identified in the plurality of content pages 210 using the similarities. Further, in some embodiments, the system 200 calculates an ER score based on the ER map. In some embodiments, only candidate attribute data having similarities counts in the ER score. The system 200 classifies the one or more candidate entities to be at least confirmed, relevant, or irrelevant based on the ER score. In some embodiments, the system 200 determines whether the ER score is greater than or equal to a threshold value. Then the system 200 classifies the one or more candidate entities to be at least confirmed, relevant, or irrelevant in response to the ER score being greater than or equal to the threshold value. In some embodiments, if an ER score of a candidate entity is lower than the threshold value, the system 200 determines the candidate entity is not yet identified as the target entity (234). As shown in FIG. 2, content pages comprising the candidate entity are kept in the folder and will be processed in the next iteration.

In some embodiments, one or more iteration parameters used in iterations 220 are user-controlled and tunable. An iteration parameter can be determined by at least one of the following factors: a number of target entities, a number of the plurality of content pages, a quality of the plurality of content pages, and an availability of initial attribute data of the target entity. In some embodiments, to obtain a good result and minimize the time spent and hardware resources utilization, the system 200 performs the second iteration by default. One or more additional iterations may be performed if there is a number of newly-added confirmed attribute data during a current iteration, and/or there is a number of content pages upgraded (for example, upgraded from relevant to confirmed) or downgraded (for example, downgraded from relevant to irrelevant). The number of newly-added confirmed attribute data is a tunable iteration parameter, and in one example, can be initially set at 5% of a number of initial candidate attribute data.

FIG. 3 illustrates an example of a content page 300 with one or more confirmed entities highlighted in accordance with some embodiments. In some embodiments, after a plurality of iterations, the system displays the plurality of content pages with one or more confirmed entities highlighted in each of the plurality of content pages. One example is shown in FIG. 3. In block 301, an address information of "123 Main Street, San Francisco, CA 12345" as confirmed attribute data is marked as "True". In block 302, one or more confirmed attribute data is explained as "organization name identified" and "full address and entity name identified". In block 303, which provides the reason details, the confirmed attribute data is explained as "organization name identified." In some embodiments, the confirmed attribute data is explained as "organization name identified" without using the organization name or entity name, but using an entity attribute such as address or phone number. And the result page includes the entity name. Thus, in this example, the reason that the attribute data are confirmed is that the organization name is identified in the content page. As shown in block 304 in FIG. 3, the confirmed entity of "ABC International Corp" is highlighted (e.g., bolded, marked with different colors, etc.) in the content page 300. In some embodiments, the confirmed attribute data is determined by the iterative classification approach described above. As shown in FIG. 3, the system thus displays a user interface providing a processed content page that is user-friendly to review. The processed content page can also facilitate more efficient auditing processes in the plurality of iterations because the system highlights the confirmed entity in each of the plurality of content pages. The disclosed technologies therefore improve the computational efficiency and performance for entity analysis and verification, compared to the conventional entity analysis and verification process performed by human researchers described above.

FIG. 4 shows an example user interface 400 illustrating attribute data comprising geographic data in accordance with some embodiments. As shown in steps 102 and 104 in FIG. 1, based on the attribute data of the target entity and the plurality of content pages, the system 100 obtains confirmed attributed data of the target entity and candidate attribute data related to one or more candidate entities. During customer information digesting (steps 102 and 104), the system 100 obtains confirmed geographic data and candidate geographic data by parsing address information. The system further obtains latitude-longitude coordinate data of the geographic data based on the geographic data.

Turning back to FIG. 4, the user interface 400 facilitates analyzing similarities of the candidate attribute data with respect to the confirmed attribute data based on the latitude-longitude coordinate data. In the user interface 400, the system can receive inputs such as the number of entries and/or a search inquiry via the drop down menu (e.g., "Show 10 entries") and the search box. With the received inputs, in block 410, user interface 400 displays the address information in the confirmed attribute data (e.g., "123 Main Street, San Francisco, CA"). In block 420, user interface 400 displays the address information of the candidate attribute data (e.g., "San Rafael, California"). On its face, the address information in the confirmed attribute data and the address information in the candidate attribute data are different from each other. The system disclosed herein can perform further analysis to determine the similarities of the candidate attribute data with respect to the confirmed attribute data.

With continued reference to FIG. 4, in blocks 411 and 421, the system (e.g., computer-implemented system 100 in FIG. 1) displays the parsed address information in the confirmed attributed data and in the candidate attributed data, respectively. The parsed address information includes one or more geographic data such as street name, neighborhood, city name, county name, and postal code. In blocks

412 and 422, the system displays latitude-longitude coordinate data of the confirmed attributed data and the candidate attribute data, respectively. The latitude-longitude coordinate data can be obtained by the system based on the geographic data. In some embodiments, the latitude-longitude coordinate data are obtained by using a location API service.

When analyzing similarities of the two latitude-longitude coordinate data (e.g., shown in blocks 412 and 422), the system calculates a distance between the latitude-longitude coordinate data of the candidate geographic data "[32.3456789, −122.1234567] (block 422)" and the latitude-longitude coordinate data of the confirmed geographic data "[37.1234567, −122.3456789] (block 421)". Based on the calculated distance, the system determines, for example, that the distance between the two latitude-longitude coordinate data is within a walking distance. Therefore, the system can determine the candidate attribute data and the confirmed attribute data are identical, although the address information in text is quite different. In another example, a target entity's address is provided as "New York City, NY"; and another content page mentions that a candidate entity is from "Manhattan, NY". The system can determine that the two entities are from a same city, by calculating the distance between the two addresses within a walking distance or a distance within certain threshold. Therefore, by using latitude-longitude coordinate data, the system achieves a more accurate similarity analysis for the one or more candidate entities. This is another technology that improves the computational efficiency and performance for entity analysis and verification, compared to the conventional entity analysis and verification process performed by human researchers described above.

FIG. 5 shows an example illustrating name matching in accordance with some embodiments. As shown in step 105 in FIG. 1, the system 100 performs a machine-learning based name matching process to determine whether the target entity is present in the plurality of contents pages. In a plurality of iterations for classifying candidate entities, the system analyzes similarities of the candidate attribute data with respect to the confirmed attribute data. In some embodiments, analyzing the similarities of the candidate attribute data with respect to the confirmed attribute data comprises performing a machine-learning based name matching process.

In some embodiments, as illustrated in FIG. 5, during the name matching process, the system can identify at least one of names comprising nick names, phonetic variations, typographical mistakes, contextual differences, reordered terms, prefixes and suffixes, abbreviations and initials, or truncated letters and missing as matched names. As a result, the system can be configured to achieve and exceed the human-level performance of the entity analysis and verification process. For examples, the system identifies the following name scenarios as matched names: Bill Clinton versus Clinton Willy; Kohl's versus Coles; Microsoft versus Mirosoft; Company versus Organization; Sam Hopkins versus Hopkins Sam; Prof Jim Hopkins versus Jim Hopkins; Alex J Wilson versus Alex Jane Wilson; and ABC International LLC versus ABC Int. Ltd.

In some embodiments, the system performs the name matching process by using a hybrid name matching model. The hybrid name matching model is composed of different models for individual name matching process and business name matching process, respectively. In some embodiments, as for individual name matching, the name matching process is based on a pre-trained NLP deep learning model and a fuzzy matching deep learning model. In some embodiments, the name matching process is based on the pre-trained NLP deep learning model, such as XLNet model, the fuzzy matching deep learning model, a python programed model with built-in rules, or the like. In some embodiments, two individual names are considered matching if at least one of the three models provides a positive matching indication (e.g., a probability of matching exceeding a threshold). Matching thresholds in the three models can be adjusted and tuned based on alert risk levels and risk tolerances of the users.

In some embodiments, for business name matching, the name matching process can be based on the fuzzy matching deep learning model. In some embodiments, a data standardization is performed before the name matching process. In some embodiments, two business names are considered matching if at least one of the four following scenarios is satisfied: (1) a fuzzy matching algorithm offers a traditional fuzzy matching score; (2) first words and second words in the two business names are similar text determined by a fuzzy logic; (3) first words in the two business names are similar text determined by the fuzzy logic, and the two business names have similar semantic meanings by using cosine comparisons; or (4) abbreviated name are detected in the two business names. In an example, the fuzzy logic includes two business names converted to vectors, such as by using a BERT model variant. Matching thresholds in the first three scenarios can be adjusted and tuned based on alert risk levels and risk tolerances of the users.

FIGS. 6 and 7 show examples illustrating entity resolution (ER) configurations in accordance with some embodiments. FIG. 6 illustrates a user interface providing ER configurations for an individual entity in an ER map 600 in accordance with some embodiments. FIG. 7 illustrates a user interface providing ER configurations for a business entity in an ER map 700 in accordance with some embodiments. ER configuration shown in FIGS. 6 and 7 include attribute type columns (610 and 710) and columns for receiving values as user inputs for the attribute types. For instance, as shown in FIG. 6, the positive flagging column 630 and negative flagging column 640 describes the nature of the attribute whether the attribute can help confirming the identification of target entity or not (630), or whether the attribute can help denying the identification of target entity (650). Based on the ER configurations, the ER module will receive one or more user inputs for indicating either positive or negative flags for candidate entities in the content page or the content page itself. As discussed above in connection with FIG. 2, during a plurality of iterations 220, the system classifies the one or more candidate entities based on the ER configurations for each of the candidate entities identified in the plurality of content pages.

In some embodiments, attribute types are listed in the ER configurations. As shown in FIGS. 6 and 7, attribute types of an individual entity are different from attribute types of a business entity. For example, listed in column 610 of ER map 600 in FIG. 6, attribute types of an individual entity include, for example, the individual's name, the date of birth (DOB), city or county, the spouse's name, the full address, the email address, a phone number, a job category, the company worked, the company owned, the organization of which the individual is a group member, and a crime type. In block 611, the name matching is considered for the individual name. In some embodiments, for individual name matching, the name matching process is based on a pre-trained NLP deep learning model and a fuzzy matching deep learning model. Turning to FIG. 7, listed in column 710 of ER map 700, attribute types of a business entity include, for example, the business name, the registration time, the registration city or state, the headquarter, city or country, the business entity's office full addresses, the entity's URL, an email address, a phone number, the owner's or manager's name, the produce type, an affiliate name, and a crime type. In block 711, name matching is considered for the business name. In some embodiments, as for business name matching, the name matching process is based on the fuzzy matching deep learning model.

Based on the similarities of the candidate attribute data, the system calculates an ER score based on the ER map. In some embodiments, candidate attribute data having similarities counts in the ER score. Name matching 611 and 711 shown in FIGS. 6 and 7, respectively, are examples for analyzing similarities of the candidate attribute data, if the candidate attribute data comprise one or more individual names or business names. Using the similarities, ER map 600 or 700 is generated for one of candidate entities identified in the plurality of content pages. Based on the similarities analysis for the candidate attribute data, the system calculates an ER score 650 or 750 for the ER map 600 or 700, respectively. In some embodiments, based on the ER score, the system classifies the one or more candidate entities to be at least confirmed, relevant, or irrelevant entities. In some embodiments, in response to the ER score being greater than or equal to a threshold value, the system classifies the one or more candidate entities to be at least confirmed, relevant, or irrelevant.

As described above, based on the similarities of the candidate attribute data, the system calculates an ER score for the ER map. In some embodiments, candidate attribute data having similarities counts in the ER score. For example, in ER map 600, a 5-score is earned for an individual name identified in a content page. The content page further mentions that a wife name of the individual person is Maria Smith, which is a confirmed attribute data. Then another 4-score is added to the ER score 650. Therefore, a total ER score 650 is 9 as shown in the EP map 600. Therefore, the individual person in the ER map 600 is classified as a confirmed entity, because the total ER score of 9 is equal to or greater than a threshold value for classifying an entity to be a confirmed entity. As shown in block 662 of FIG. 6, in one example, the threshold value of classifying an entity as a confirmed entity is 9. As a result, the system extracts corresponding candidate attribute data related to the confirmed entities as confirmed knowledge, and moves the confirmed attribute data from the candidate database to the confirmed database.

As shown in block 661 of FIG. 6, in one example, the threshold value of classifying an entity as a relevant entity is 7. For example, if a total score for an ER map for a candidate individual entity is 7 or 8, which is lower than the threshold value for a confirmed entity, but higher than or equal to a threshold value for a relevant entity, the candidate entity (in this case, an individual entity) is classified as a relevant candidate entity. When the candidate entities are classified as relevant entities, the system extracts knowledge of the candidate entities classified as relevant entities to be relevant knowledge. Similar threshold values for classifying an entity as a relevant entity or a confirmed entity can also be configured for generating a business entity ER map 700, as illustrated in blocks 761 and 762 in FIG. 7.

As shown in column 620 in FIG. 6, cross-entity attribute data are considered in the individual entity ER map 600. The cross-entity attribute data are attribute data that are cross-linked to other entities in the content page, and the other entities may not be directly related to each other. Similar to column 620 in FIG. 6, cross-entity attribute data are considered in the business ER map 700 as shown column 720 in FIG. 7. For example, individual A's wife is named Maria Smith. The content page (or another content page) may also include descriptions that individual A has a transaction with company "Happy-ABC" as part of the alert. The content page describes both Maria Smith and Happy-ABC, then an ER score of 9 may be derived for the Happy-ABC entity resolution, even though Maria Smith and Happy-ABC are not directly related to each other. The ER score of 9 is derived based on the cross-entity link between the two entities disclosed in a same content page(s) and/or other disclosures linking the entities.

In one embodiment, the ER score of 9 is equal to the threshold value for classifying an entity to be a confirmed entity. As a result, the system extracts corresponding candidate attribute data related to the confirmed entities as confirmed knowledge, and moves the confirmed attribute data from the candidate database to the confirmed database. In some embodiments, the system determines the confirmed attribute data, e.g., "Happy-ABC" and "Maria Smith" are confirmed attribute data of the one or more target entity. Therefore, the content page can be used to derived confirmed knowledges for at least one targeted entity in scope. In each of the plurality of iterations, the system extracts candidate attribute data in content pages determined as confirmed or relevant, and determines the corresponding candidate attribute data as confirmed knowledge and relevant knowledge, respectively. The content pages associated with the relevant candidate entities are kept in the folder and will be processed in the next iteration. As for candidate entities classified to be irrelevant entities, the system discards content pages associated with candidate entities classified as irrelevant candidate entities. In some embodiments, if the target entity is not yet identified in a content page, the content pages are kept in the folder and will be processed in the next iteration, rather than discarded.

As shown in the FIG. 6, an attribute type can be marked as positive flagging or negative flagging. The 'Y' and 'N' value indicate each attribute's capability to help identifying if the candidate entity present in the content page is target entity or not, or impossible our target entity. The exact score will provide a quantified scale to measure the entity resolution capability of each attribute in general. For example, in the user interface provided by ER map 600, if candidate attribute data are marked (e.g., using the letter "Y") for positive flagging in column 630, the candidate attribute data related to the candidate entity in the content page can be determined as confirmed attribute data of the at least one target entity. The system assigns a score to the individual entity in the ER map 600. In some embodiments, if candidate attribute data entity attribute types are marked (e.g., using the letter "N") for not positive flagging in column 630, the candidate attribute data related to the candidate entity in the content page are not confirmed attribute data of the at least one target entity. And the system does not assign a score to the individual entity in the ER map 600. As shown in column 640 in FIG. 6, if the attribute types are marked (e.g., using the letter "N" or empty) in column 640 for negative flagging, the system can NOT use these attribute to exclude any possibilities of the candidate entity being at least one target entity, even though the candidate attribute data related to the candidate entity in the content page are much different from confirmed knowledge of the at least one targeted entity. Positive flagging or negative flagging may also be marked as shown in columns 730 and 740 in the business ER map 700 in FIG. 7. The ER map (for example, an individual ER map 600, or a business ER map 700) serves as an important dictionary that described the nature of entity attributes and their capability to help confirm or deny the true entity compared to existing accumulated customer knowledge.

As shown in column 660 in FIG. 6, some exceptions are considered in the individual entity ER map 600. In some embodiments, for attribute data comprising age or DOB information, the similarities are determined based on age differences between the candidate attribute data and the target attribute data. If the age differences are within a certain threshold, e.g., five years, the system assigns an ER score for age related attribute types in the ER map 660. For example, as shown in block 661 in FIG. 6, if an age difference is between 2-5 years, the system assigns a 3-score to this candidate entity in the ER map 600. In some embodiments, if a city or county name of the candidate entity is missing, and a state information of the candidate entity is matched with that of the target entity, the system assigns a small score (e.g., a 1-score) to this candidate entity in the ER map 600. Similar to column 660 in FIG. 6, an exception is considered in the business ER map 700 as shown in column 760 in FIG. 7. In some embodiments, when product information of the candidate entity is not available, the system assigns 3-score for a matched industry type in the business ER map 700.

As described above in connection with FIG. 1, based on the results of machine-learning based entity resolution (step 106) and machine-learning based knowledge extraction (step 107) processes, the system can provide a summarization map (step 108). FIG. 8 illustrates an example of a summarization map 800 in accordance with some embodiments. As shown in FIG. 8, in rows 810 and 820, customer knowledge related to candidate entities "John B. Smith" and "ABC International Corp" are shown in the summarization map 800 as examples. The customer knowledge includes candidate attribute data extracted by using at least one information extraction deep learning model, such as the machine QA deep leaning model. The machine QA deep leaning model can answer questions by extracting phrases from paragraphs, paraphrasing answers generatively, or choosing one option out from a list of given options. In some embodiments, during the plurality of iterations (e.g., iterations 220 shown in FIG. 2), for candidate entities classified to be confirmed entities, the system extracts corresponding candidate attribute data related to the confirmed entities as confirmed knowledge. For candidate entities classified to be relevant entities, the system extracts corresponding candidate attribute data related to the relevant candidate entities as relevant knowledge. In some embodiments, the system converts that candidate attribute data extracted from the content pages to vectors using a BERT (Bidirectional Encoder Representations from Transformers) variant model, and performs a K-mean clustering process for the vectors. In some embodiments, during the extraction, the system also records source information of the candidate attribute data. The source information identifies the sources of extracted candidate attributed data in the plurality of content pages. As shown in FIG. 8, in row 830, the source information (e.g., source_link) as well as part of the content pages are shown in summarization map 800.

In some embodiment, the summarization map is generated by predicting relevance for the candidate attribute data related to the candidate entities. The system extracts most relevant attribute data for the candidate entities based on the predicted relevance. In some embodiment, the system predicts relevance for the candidate attribute data by performing an information similarity evaluation using a semantic similarity model. In some embodiments, a list of labels is generated based on the extracted confirmed attribute data and relevant attribute data for each of attribute types (e.g., attribute types in columns 610 and 710 in FIGS. 6 and 7, respectively). By using the semantic similarity model, similarity scores are calculated for each of the labels in the list. The most relevant attribute data is the attribute data with a highest similarity score in each of the attribute types. In some embodiments, based on the predicted relevance, the system extracts most relevant attribute data for the candidate entities using at least one information extraction deep learning model, such as the machine QA deep learning model.

FIG. 9 shows a flowchart illustrating an example computer-implemented method 900 to perform an entity analysis and verification process. The method 900 is performed by a system comprising one or more processors (e.g., system 100 or 1200). In step 910 of method 900, the system receives an indication of at least one target entity and attribute data of the target entity. In some embodiments, the indication of the target entity comprises an alerted case that the target entity may involve.

In step 920 of method 900, the system collects a plurality of content pages comprising candidate attribute data related to one or more candidate entities. In some embodiments, the system collects the plurality of content pages by performing an entity search. In some examples, a search API used for the entity search includes a Google™ search API, a Microsoft™ Bing search API, a LexisNexis™ API, or the like. In return, the system receives a plurality of uniform resource locators (URLs) from each API search action. In some embodiments, the system extracts content (e.g., text) from each of the plurality of URLs by using a Python program for web scrapping, and saves the content in a content page in an image format. A plurality of contents pages are stored in a separate folder for future reference.

In step 930 of method 900, the system obtains confirmed attributed data of the target entity and candidate attribute data related to one or more candidate entities based on the attribute data of the target entity and the plurality of content pages. The system obtains the attribute data and the candidate data by using the NER deep learning model or the pattern recognition model to digest the indication of the target entity and the plurality of the content pages. In some embodiments, during obtaining the attribute data, the system generates a confirm database configured to store confirmed attribute data and generating a candidate database configured to store candidate attribute data.

In some embodiments, for attribute data comprising geographic data, the system obtains confirmed geographic data and candidate geographic data by parsing address information. In some embodiments. The system further obtains corresponding latitude-longitude coordinate data of the geographic data based on the obtained geographic data. In some embodiments, the latitude-longitude coordinate data are obtained by using, for example, a location API service. In some embodiments, the system identifies address information by using an information extraction deep learning model.

In step 940 of method 900, the system iteratively classifies the one or more candidate entities identified in the plurality of content pages based on one or more machine-learning models. The step 940 of iterative classification is described in greater detail further below with reference to FIG. 10.

In step 950 of method 900, after a plurality of iterations, the system displays the plurality of content pages with one or more confirmed entities and confirmed attribute data highlighted in each of the plurality of content pages. The one or more confirmed entities are identified as corresponding to the at least one target entity. In some embodiments, the highlighted confirmed entities and confirmed attribute data are determined based on the iterative classification. In some embodiments, the system highlights the confirmed entities and confirmed attribute data in the plurality of content pages. This provides a user-friendly interface for reviewing and auditing processes performed in the plurality of iterations.

In step 960 of method 900, the system triggers at least one action based on the plurality of content pages, the one or more confirmed entities, the classification of candidate entities, or a combination thereof. In some embodiments, based on information clustering, the system generates a summarization map for the candidate entities using the classification of the candidate entities. In some embodiment, for generating the summarization map, the system predicts relevance for the candidate attribute data related to the candidate entities and extracts most relevant attribute data for the candidate entities. In some embodiments, using semantic similarity model, the system performs an information similarity evaluation to predict the relevance for the candidate attribute data. In some embodiments, using at least one information extraction deep learning model, the system extracts most relevant attribute data for the candidate entities. In some embodiments, the system uses the machine QA deep leaning model to extract most relevant attribute data for candidate entities.

By using the disclosed system to perform entity analysis and verification, the processing speed can be improved. The average processing speed of the system can be, for example, eight times (or more) faster than that using a traditional device operated by human researchers. Moreover, the performance of disclosed system configured to perform an entity analysis and verification process is more consistent, accurate, and without random human error.

FIG. 10 shows a flowchart illustrating an example method 1000 to perform iteratively classification for the one or more candidate entities identified in the plurality of content pages. In step 940 in FIG. 10, which is the same step 940 in FIG. 9, the system iteratively classifies the one or more candidate entities identified in the plurality of content pages. During each of a plurality of iterations, the system performs the follow steps: analyzing similarities of the candidate attribute data with respect to the confirmed attribute data (step 1010), classifying the one or more candidate entities to be at least confirmed, relevant, or irrelevant entities based on the similarities of the candidate attribute data (step 1020), classifying the corresponding candidate attribute data related to the candidate entities to be confirmed, relevant, or irrelevant attribute data (step 1030), and discarding content pages associated with candidate entities classified as irrelevant (step 1040). After the plurality of iterations, the system displays the plurality of content pages with one or more confirmed entities highlighted in each of the plurality of content pages (step 950, same as step 950 in FIG. 9). The one or more confirmed entities are identified as corresponding to the target entity.

In step 1010 of method 1000, the system analyzes similarities of the candidate attribute data with respect to the confirmed attribute data. In some embodiments, for the attribute data comprising geographic data, analyzing the similarities of the candidate geographic data with respect to the confirmed geographic data comprises calculating a distance between the latitude-longitude coordinate data of the candidate geographic data and the latitude-longitude coordinate data of the confirmed geographic data. In some embodiments, the latitude-longitude coordinate data is obtained based on the geographic data.

In some embodiments, for the attribute data comprising individual names or business names, analyzing the similarities of candidate names with respect to confirmed names comprises performing a name matching process. In some embodiments, performing the name matching process is based on at least one of a pre-trained NLP deep learning model or a fuzzy matching deep learning model. In some embodiments, for individual name matching, the name matching process is based on a pre-trained NLP deep learning model and a fuzzy matching deep learning model. In some embodiments, for business name matching, the name matching process is based on the fuzzy matching deep learning model. In some embodiments, during performing the name matching process, the system identifies at least one of names comprising nick names, phonetic variations, typographical mistakes, contextual differences, reordered terms, prefixes and suffixes, abbreviations and initials, or truncated letters and missing as matched names. As a result, the system enables to achieve and exceed the human-level performance of the entity analysis and verification process.

In step 1020 of method 1000, the system classifies the one or more candidate entities to be at least confirmed, relevant, or irrelevant entities based on the similarities of the candidate attribute data. In some embodiments, an ER map is obtained for each of the candidate entities identified in the plurality of content pages using the similarities. Based on the similarities analysis for the candidate attribute data, the system calculates an ER score based on the ER map. In some embodiments, based on the ER score, the system classifies the one or more candidate entities to be at least confirmed, relevant, or irrelevant entities. In some embodiments, in response to the ER score being greater than or equal to a threshold value, the system classifies the one or more candidate entities to be at least confirmed, relevant, or irrelevant.

In step 1030 of method 1000, the system classifies corresponding candidate attribute data related to the candidate entities to be confirmed, relevant, or irrelevant attribute data. In each of the plurality of iterations, for candidate entities classified to be confirmed entities, the system extracts corresponding candidate attribute data related to the confirmed entities as confirmed knowledge. In some embodiments, the system moves the candidate attribute data classified as confirmed attribute data from the candidate database to the confirmed database. In each of the plurality of iterations, for candidate entities classified to be relevant entities, the system extracts corresponding candidate attribute data related to the relevant candidate entities as relevant knowledge. The content pages associated with the relevant candidate entities are kept in the folder and will be processed in next iteration. The folder is the original folder configured to store the plurality of content pages described above in step 920 of method 900; In each of the plurality of iterations, for candidate entities classified to be irrelevant entities, the system discards content pages associated with candidate entities classified as irrelevant (step 1040). In some embodiments, the system extracts corresponding candidate attribute data related to the irrelevant candidate entities as irrelevant knowledge, and determines the irrelevant knowledge to be noise and not for further use. In some embodiments, if the target entity is not yet identified in a content page, the content pages are kept in the folder and will be processed in next iteration, rather than discarded. In the next iteration, candidate entity in this content page may be classified as confirmed entity, or relevant entity.

In step 950 in FIG. 10 (same step 950 in FIG. 9), after the plurality of iterations, the system displays the plurality of content pages with one or more confirmed entities and confirmed attribute data highlighted in each of the plurality of content pages. The one or more confirmed entities are identified as corresponding to the at least one target entity.

FIG. 11 shows a flowchart illustrating an example method 1100 for classifying the one or more candidate entities. In step 940 in FIG. 11 (same step 940 in FIG. 9), the system iteratively classifies the one or more candidate entities identified in the plurality of content pages. During a plurality of iterations, the system analyzes similarities of the candidate attribute data with respect to the confirmed attribute data (step 1010, same step 1010 in FIG. 1010). Based on the similarities of the candidate attribute data, the system classifies the one or more candidate entities to be at least confirmed, relevant, or irrelevant entities.

In step 1110, using the similarities, the system obtains an ER map for each of the candidate entities identified in the plurality of content pages. In some embodiments, entity attribute types are listed in the ER map. Attribute types of an individual entity are different from attribute types of a business entity. In some embodiments, if candidate attribute data are identified in the plurality of the content pages, the corresponding attribute types are marked as positive flagging in the ER map.

In step 1120, the system calculates an ER score for the ER map. In some embodiment, the system classifies the one or more candidate entities to be at least confirmed, relevant, or irrelevant based on the entity resolution score.

In some embodiments, the system determines whether the ER score is greater than or equal to a threshold value (step 1130), and classifies the one or more candidate entities in response to that the ER score is greater than or equal to the threshold value (step 1140). In some embodiments, if an ER score is lower than the threshold value due to candidate entities not yet identified in content pages, the corresponding content pages are kept in the folder and will be processed in next iteration. The folder is the original folder configured to store the plurality of content pages described above in step 920 of method 900.

The technologies disclosed in the above embodiments can be used for various purposes, including, for example, searching, identifying, and recognizing entities in real life, and customer knowledge enrichment. Typical technology applications can include: banking compliance investigation, fraud investigation, research for missing people, negative news analysis, criminal activity or entity financial information analysis, etc. The technologies disclosed herein can improve the computational efficiencies of a special purpose computer configured for performing the entity research, analysis, and resolution, can significantly reduce human error, improve the effectiveness, consistence and auditability of the entity research compared to existing technologies and procedures.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of at least some of the FIGS. 9-11, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 12:
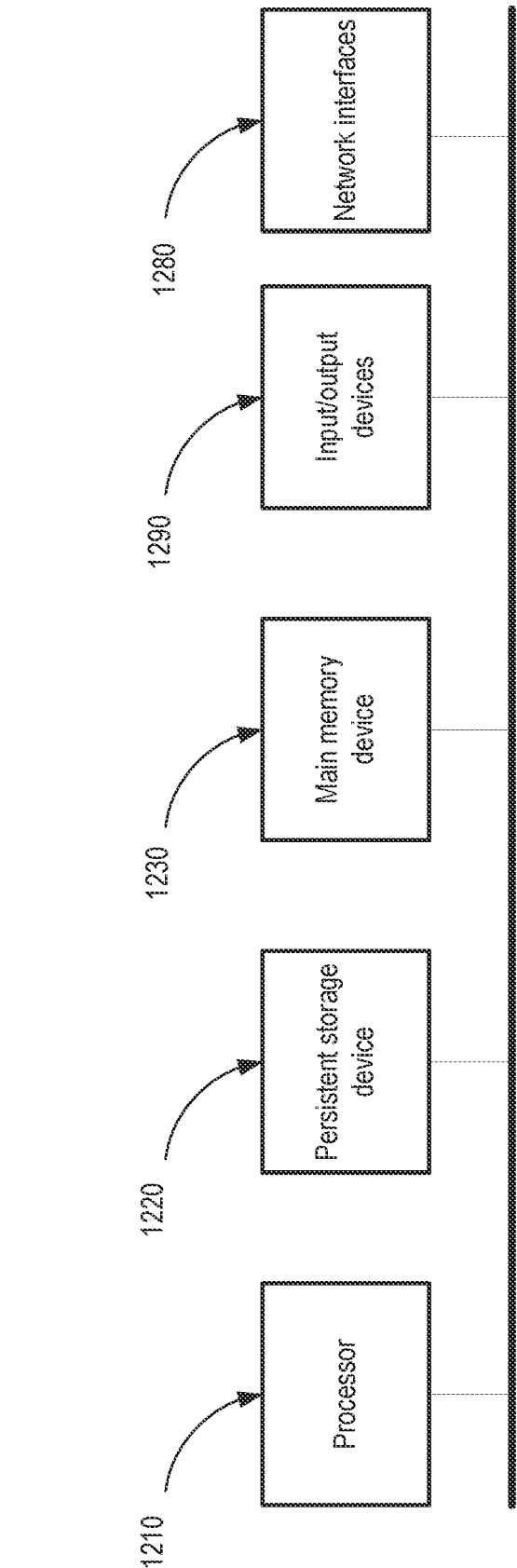
FIG. 12 illustrates exemplary apparatus used to implement systems, apparatus, and methods in various embodiments.

A high-level block diagram of an example apparatus that may be used to implement systems, apparatus and methods described herein is illustrated in FIG. 12. Apparatus 1200 comprises a processor 1210 operatively coupled to a persistent storage device 1220 and a main memory device 1230. Processor 1210 controls the overall operation of apparatus 1200 by executing computer program instructions that define such operations. The computer program instructions may be stored in persistent storage device 1220, or other computer-readable medium, and loaded into main memory device 1230 when execution of the computer program instructions is desired. For example, processor 1210 may be used to implement one or more components and systems described herein, such as computer-implemented system 100, customer attribute understanding (CAU) engine 110, customer identification and resolution (CIR) engine 120, and customer knowledge extraction and summary (CKE) engine 130 (shown in FIG. 1). Thus, the method steps of at least some of FIGS. 9-11 can be defined by the computer program instructions stored in main memory device 1230 and/or persistent storage device 1220 and controlled by processor 1210 executing the computer program instructions. For example, the computer program instructions can be implemented as computer executable code programmed by one skilled in the art to perform an algorithm defined by the method steps discussed herein in connection with at least some of FIGS. 9-11. Accordingly, by executing the computer program instructions, the processor 1210 executes an algorithm defined by the method steps of these aforementioned figures. Apparatus 1200 also includes one or more network interfaces 1280 for communicating with other devices via a network. Apparatus 1200 may also include one or more input/output devices 1290 that enable user interaction with apparatus 1200 (e.g., display, keyboard, mouse, speakers, buttons, etc.).

Processor 1210 may include both general and special purpose microprocessors and may be the sole processor or one of multiple processors of apparatus 1200. Processor 1210 may comprise one or more central processing units (CPUs), and one or more graphics processing units (GPUs), which, for example, may work separately from and/or multi-task with one or more CPUs to accelerate processing, e.g., for various image processing applications described herein. Processor 1210, persistent storage device 1220, and/or main memory device 1230 may include, be supplemented by, or incorporated in, one or more application-specific integrated circuits (ASICs) and/or one or more field programmable gate arrays (FPGAs).

Persistent storage device 1220 and main memory device 1230 each comprise a tangible non-transitory computer readable storage medium. Persistent storage device 1220, and main memory device 1230, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EE-PROM), compact disc read-only memory (CD-ROM), digital versatile disc read-only memory (DVD-ROM) disks, or other non-volatile solid state storage devices.

Input/output devices 1290 may include peripherals, such as a printer, scanner, display screen, etc. For example, input/output devices 1290 may include a display device such as a cathode ray tube (CRT), plasma or liquid crystal display (LCD) monitor for displaying information to a user, a keyboard, and a pointing device such as a mouse or a trackball by which the user can provide input to apparatus 1200.

Any or all of the functions of the systems and apparatuses discussed herein may be performed by processor 1210, and/or incorporated in, an apparatus or a system such as the computer-implemented system 100. Further, the computer-implemented system 100 and/or apparatus 1200 may utilize one or more neural networks or other deep-learning techniques performed by processor 1210 or other systems or apparatuses discussed herein.

One skilled in the art will recognize that an implementation of an actual computer or computer system may have other structures and may contain other components as well, and that FIG. 12 is a high-level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method performed by a system comprising one or more processors, comprising:

receiving an indication of at least one target entity and attribute data of the target entity, wherein the at least one target entity comprises at least one of a target individual entity and a target business entity, wherein the attribute data of target individual entity comprises at least one of name, age, address, contact information, and family members or relatives of the target individual entity, and negative news or crime activity related to the target individual entity, wherein the attribute data of target business entity comprises at least one of name of the target business entity, owner or manager names, registration information, office address, industry type, product or service type, affiliates, negative news or lawsuit related to the target business entity;

obtaining, from the indication of the at least one target entity, attribute data of the target entity as confirmed attribute data, wherein obtaining attribute data of the target entity as the confirmed attribute data comprises:
generating a confirmed database configured to store the confirmed attribute data;

collecting a plurality of content pages comprising candidate attribute data related to one or more candidate entities;

obtaining, from the plurality of content pages, candidate attribute data related to one or more candidate entities, wherein obtaining the candidate attribute data comprises:
generating a candidate database configured to store candidate attribute data;

after collecting the plurality of content pages and obtaining confirmed attributed data of the target entity and candidate attribute data related to one or more candidate entities, iteratively classifying, based on one or more machine-learning models, the one or more candidate entities identified in the plurality of content pages, by performing, during one iteration of a plurality of iterations, steps of:

analyzing similarities of the candidate attribute data with respect to the confirmed attribute data, wherein analyzing similarities of the candidate attribute data with respect to the confirmed attribute data comprising calculating similarity scores based on the one or more machine-learning models, classifying, based on the calculated similarity scores and a plurality of threshold values for the one or more machine-learning models, the one or more candidate entities to be at least confirmed, relevant, or irrelevant entities based on the similarities of the candidate attribute data, classifying corresponding candidate attribute data related to the candidate entities to be confirmed, relevant, or irrelevant attribute data, and moving candidate attribute data classified as confirmed attribute data from the candidate database to the confirmed database, discarding content pages associated with candidate entities classified as irrelevant, wherein the steps performed during a current iteration form a basis of a more accurate classification in a next iteration;

displaying the plurality of content pages with one or more confirmed entities highlighted in each of the plurality of content pages, the one or more confirmed entities being identified as corresponding to the at least one target entity; and triggering at least one action based on the plurality of content pages, the one or more confirmed entities, the classification of candidate entities, or a combination thereof.

2. The method according to claim 1, wherein obtaining the confirmed attribute data and the candidate attribute data comprises using a natural entity recognition (NER) deep learning model, machine question-answering (QA) deep learning model or a pattern recognition model to digest the indication of the at least one target entity and the plurality of content pages.

3. The method according to claim 1, wherein obtaining the confirmed attribute data and the candidate attribute data comprises obtaining confirmed geographic data and candidate geographic data.

4. The method according to claim 3, wherein obtaining the confirmed geographic data and the candidate geographic data comprises obtaining latitude-longitude coordinate data of the confirmed geographic data and latitude-longitude coordinate data of the candidate geographic data.

5. The method according to claim 4, wherein analyzing similarities of the candidate geographic data with respect to the confirmed geographic data comprises calculating a distance between the latitude-longitude coordinate data of the candidate geographic data and the latitude-longitude coordinate data of the confirmed geographic data.

6. The method according to claim 1, wherein analyzing the similarities of the candidate attribute data with respect to the confirmed attribute data comprises performing a name matching process.

7. The method according to claim 6, wherein performing the name matching process is based on at least one of a pre-trained natural language processing (NLP) deep learning model or a fuzzy matching deep learning model.

8. The method according to claim 6, wherein performing the name matching process comprises identifying at least one of names comprising nick names, phonetic variations, typographical mistakes, contextual differences, reordered terms, prefixes and suffixes, abbreviations and initials, or truncated letters and missing as matched names.

9. The method according to claim 1, wherein classifying the one or more candidate entities to be at least confirmed, relevant, or irrelevant comprises:
   obtaining an entity resolution map for each of the candidate entities identified in the plurality of content pages using the similarities,
   calculating an entity resolution score based on the entity resolution map, and
   classifying the one or more candidate entities to be at least confirmed, relevant, or irrelevant based on the entity resolution score.

10. The method according to claim 9, wherein classifying the one or more candidate entities to be at least confirmed, relevant, or irrelevant based on the entity resolution score comprises:
   determining whether the entity resolution score is greater than or equal to a first threshold value; and
   classifying the one or more candidate entities in response to that the entity resolution score is greater than or equal to the first threshold value.

11. The method according to claim 1, wherein triggering the at least one action comprises generating, based on information clustering, a summarization map for the candidate entities using the classification of the candidate entities.

12. The method according to claim 11, wherein generating the summarization map for the candidate entities comprises:
   predicting relevance for the candidate attribute data related to the candidate entities based on the classification of the candidate entities; and
   extracting most relevant attribute data for the candidate entities based on the predicted relevance.

13. The method according to claim 12, wherein the predicting relevance for the candidate attribute data comprises performing an information similarity evaluation.

14. The method according to claim 12, wherein the extracting most relevant attribute data comprises using at least one information extraction deep learning model.

15. A computer-implemented system, comprising:
   one or more processors and one or more non-transitory memory storing computer-readable instructions that, when executed by one or more processors, cause the one or more processors to perform the steps of:
   receiving an indication of at least one target entity and confirmed attribute data of the target entity, wherein the at least one target entity comprises at least one of a target individual entity and a target business entity, wherein the attribute data of target individual entity comprises at least one of name, age, address, contact information, and family members or relatives of the target individual entity, and negative news or crime activity related to the target individual entity, wherein the attribute data of target business entity comprises at least one of name of the target business entity, owner or manager names, registration information, office address, industry type, product or service type, affiliates, negative news or lawsuit related to the target business entity;
   obtaining, from the indication of the at least one target entity, attribute data of the target entity as confirmed attribute data, wherein obtaining attribute data of the target entity as the confirmed attribute data comprises:
      generating a confirmed database configured to store the confirmed attribute data;
   collecting a plurality of content pages comprising candidate attribute data related to one or more candidate entities;
   obtaining, from the plurality of content pages, candidate attribute data related to one or more candidate entities, wherein obtaining the candidate attribute data comprises:
      generating a candidate database configured to store candidate attribute data;
   after collecting the plurality of content pages and obtaining confirmed attributed data of the target entity and candidate attribute data related to one or more candidate entities, iteratively classifying, based on one or more machine-learning models, the one or more candidate entities identified in the plurality of content pages, by performing, during one iteration of a plurality of iterations, steps of:
      analyzing similarities of the candidate attribute data with respect to the confirmed attribute data, wherein analyzing similarities of the candidate attribute data with respect to the confirmed attribute data comprising calculating similarity scores based on the one or more machine-learning models,
      classifying, based on the calculated similarity scores and a plurality of threshold values for the one or more machine-learning models, the one or more candidate entities to be at least confirmed, relevant, or irrelevant entities based on the similarities of the candidate attribute data,
      classifying corresponding candidate attribute data related to the candidate entities to be confirmed, relevant, or irrelevant attribute data, and
      moving candidate attribute data classified as confirmed attribute data from the candidate database to the confirmed database,
      discarding content pages associated with candidate entities classified as irrelevant, wherein the steps performed during a current iteration form a basis of a more accurate classification in a next iteration;

displaying the plurality of content pages with one or more confirmed entities highlighted in each of the plurality of content pages, the one or more confirmed entities being identified as corresponding to the at least one target entity; and triggering at least one action based on the plurality of content pages, the one or more confirmed entities, the classification of candidate entities, or a combination thereof.

16. The system according to claim 15, wherein obtaining the confirmed attribute data and the candidate attribute data comprises using a natural entity recognition (NER) deep learning model, machine question-answering (QA) deep learning model, or a pattern recognition model to digest the indication of the at least one target entity and the plurality of content pages.

17. The system according to claim 15, wherein obtaining the confirmed attribute data and the candidate attribute data comprises obtaining confirmed geographic data and candidate geographic data.

18. The system according to claim 17, wherein obtaining the confirmed geographic data and the candidate geographic data comprising obtaining latitude-longitude coordinate data of the confirmed geographic data and latitude-longitude coordinate data of the candidate geographic data.

19. The system according to claim 18, wherein analyzing similarities of the candidate geographic data with respect to the confirmed geographic data comprises calculating a distance between the latitude-longitude coordinate data of the candidate geographic data and the latitude-longitude coordinate data of the confirmed geographic data.

20. The system according to claim 15, wherein analyzing the similarities of the candidate attribute data with respect to the confirmed attribute data comprises performing a name matching process.

21. The system according to claim 20, wherein performing the name matching process is based on at least one of a pre-trained natural language processing (NLP) deep learning model or a fuzzy matching deep learning model.

22. The system according to claim 20, wherein performing the name matching process comprises identifying at least one of names comprising nick names, phonetic variations, typographical mistakes, contextual differences, reordered terms, prefixes and suffixes, abbreviations and initials, or truncated letters and missing as matched names.

23. The system according to claim 15, wherein classifying the one or more candidate entities to be at least confirmed, relevant, or irrelevant comprises:

obtaining an entity resolution map for each of the candidate entities identified in the plurality of content pages using the similarities, calculating an entity resolution score based on the entity resolution map, and classifying the one or more candidate entities to be at least confirmed, relevant, or irrelevant based on the entity resolution score.

24. The system according to claim 23, wherein classifying the one or more candidate entities to be at least confirmed, relevant, or irrelevant based on the entity resolution score comprises:

determining whether the entity resolution score is greater than or equal to a first threshold value; and classifying the one or more candidate entities in response to that the entity resolution score is greater than or equal to the first threshold value.

25. The system according to claim 15, wherein triggering the at least one action comprising generating, based on information clustering, a summarization map for the candidate entities using the classification of the candidate entities.

26. The system according to claim 25, wherein generating the summarization map for the candidate entities comprises:

predicting relevance for the candidate attribute data related to the candidate entities based on the classification of the candidate entities; and extracting most relevant attribute data for the candidate entities based on the predicted relevance.

27. The system according to claim 26, wherein predicting relevance for the candidate attribute data comprises performing an information similarity evaluation.

28. The system according to claim 26, wherein extracting most relevant attribute data comprises using at least one information extraction deep learning model.

* * * * *